(12) United States Patent
Alzahrani

(10) Patent No.: US 12,344,395 B2
(45) Date of Patent: Jul. 1, 2025

(54) METHODS AND APPARATUS FOR MULTI-ROLE AIR-LAUNCHED SMALL UNMANNED AIRCRAFT SYSTEMS (SUAS) AND LOITERING MUNITION

(71) Applicant: UNMANNED X, Riyadh (SA)

(72) Inventor: Saeid A. Alzahrani, Riyadh (SA)

(73) Assignee: UNMANNED X, Riyadh (SA)

( * ) Notice: Subject to any disclaimer, the term of this patent is extended or adjusted under 35 U.S.C. 154(b) by 764 days.

(21) Appl. No.: 17/587,905

(22) Filed: Jan. 28, 2022

(65) Prior Publication Data

US 2022/0324572 A1   Oct. 13, 2022

Related U.S. Application Data

(60) Provisional application No. 63/199,869, filed on Jan. 29, 2021.

(51) Int. Cl.
| | |
|---|---|
| *B64D 5/00* | (2006.01) |
| *B64D 7/00* | (2006.01) |
| *B64U 10/25* | (2023.01) |
| *B64U 20/60* | (2023.01) |
| *B64U 70/20* | (2023.01) |
| *B64U 101/16* | (2023.01) |

(52) U.S. Cl.
CPC ............... *B64D 5/00* (2013.01); *B64D 7/00* (2013.01); *B64U 10/25* (2023.01); *B64U 20/60* (2023.01); *B64U 70/20* (2023.01); *B64U 2101/16* (2023.01)

(58) Field of Classification Search
CPC . B64D 5/00; B64D 7/00; B64U 20/60; B64U 10/25; B64U 70/20; B64U 2101/16
See application file for complete search history.

(56) References Cited

U.S. PATENT DOCUMENTS

| | | | |
|---|---|---|---|
| 10,392,109 B2 * | 8/2019 | Drennan | B64U 30/14 |
| 2009/0294573 A1 * | 12/2009 | Wilson | B64U 10/25 |
| | | | 703/7 |
| 2010/0193625 A1 * | 8/2010 | Sommer | B64U 20/40 |
| | | | 244/2 |
| 2018/0222583 A1 * | 8/2018 | Parks | B64C 19/00 |
| 2020/0140087 A1 * | 5/2020 | Fulbright | A62C 3/0235 |
| 2022/0041279 A1 * | 2/2022 | Rowse | G05D 1/104 |

FOREIGN PATENT DOCUMENTS

| | | | | |
|---|---|---|---|---|
| EP | 3006334 A1 * | 4/2016 | ........... | B64C 39/024 |
| EP | 3006334 B1 * | 7/2018 | ........... | B64C 39/024 |
| WO | WO-2017071772 A1 * | 5/2017 | ............. | B64C 37/02 |

* cited by examiner

*Primary Examiner* — Benjamin P Lee
(74) *Attorney, Agent, or Firm* — NIXON & VANDERHYE P.C.

(57) ABSTRACT

Techniques and systems are provided for the deployment of small Unmanned Aircraft Systems (sUAS) and Loitering Munitions (LM) from an airborne Small Tactical Unmanned Aircraft System (STUAS).

9 Claims, 22 Drawing Sheets

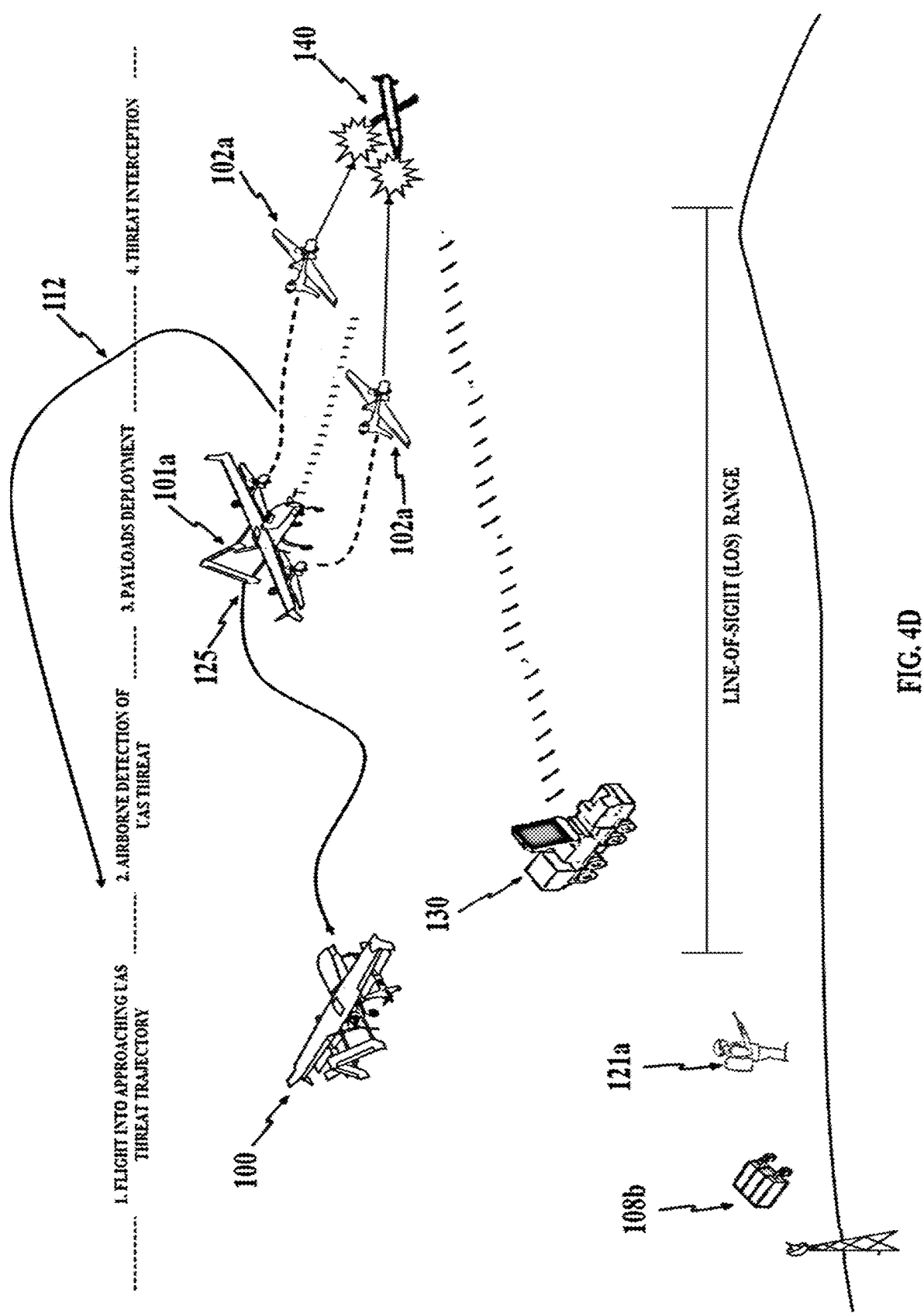

METHODS AND APPARATUS FOR MULTI-ROLE AIR-LAUNCHED SMALL UNMANNED AIRCRAFT SYSTEMS (SUAS) AND LOITERING MUNITION

CROSS REFERENCE(S) TO RELATED APPLICATION(S)

This application claims priority to U.S. Provisional Application No. 63/199,869, filed on Jan. 29, 2021, the entire contents of which are hereby incorporated by reference.

FIELD

The present disclosure relates generally to the deployment of small Unmanned Aircraft Systems (sUAS) and Loitering Munitions (LM) from an airborne Small Tactical Unmanned Aircraft System (STUAS). More particularly, to methods and apparatus to deploy multiple asymmetric or symmetric sUAS and LMs; by air-launching them simultaneously from an attritable STUAS while airborne (collectively the "Family of Unmanned Aircraft Systems (FoUAS) platform"). The FoUAS platform is configured as a multi-role precision strike, decoy, and ISR platform with the ability to perform as a single agent or a member of a swarm team in offensive operations and missions including SEAD/DEAD missions, High Value Targeting (HVT) missions, Multi-Domain Operations (MDO), and a member of Manned-Unmanned Team (MUM-T) in Close Air Support (CAS) missions. The FoUAS platform is also configured to act as a single agent or a swarm team in defensive operations such as Counter-Unmanned Air System (C-UAS) against a single or a member of a swarm team in defensive operations of Low, Slow and Small-Unmanned Aerial Systems (LSS-UASs) threats.

INTRODUCTION

The unmatched warfare capabilities of Loitering Munitions (LMs) and Unmanned Aircraft Systems (UAS) from Group 1 UAS weighting less than 20 pounds, Group 2 UAS weighting between 21 pounds to 55 pounds, and Group 3 UAS weighting between 56 pounds to 1320 pounds; have replaced most of the larger Unmanned Combat Aerial Vehicles (UCAVs) and fighter aircrafts roles; to perform strike missions against targets in hostile airspace.

Loitering munitions (LMs) are classified as relatively low-cost Group1 to Group 3 Unmanned Aircraft Systems (UAS) designed to fill the capability gap between traditional Precision Guided Munitions (PGM) and Homing Missiles, LMs are often referred as suicide or kamikaze drones. Modern LMs are able to loiter and maneuver for relatively longer time over a pre-defined area with a terminal homing capability using high resolution electro-optical and infrared (EO/IR) seekers equipped with an explosive warhead to effectively attack beyond line-of-sight high-value and time-sensitive targets, particularly in densely populated areas where targets may blend into civilian environment to make themselves difficult to identify and engage. Unlike other types of UAS of equivalent size and weight, LMs are may not meant to be recovered after the mission is over. However, LMs are limited in what they can provide by themselves due to performance limitations and current launch methodologies.

A Loitering Munitions (LMs) swarm is defined as a group of two or more semi or fully autonomous LMs simulating a biological bee colony capable of conducting complex missions without direct human supervision or Man in The Loop (MITL) guidance. Each LM in the swarm may be equipped with onboard computer powered by Artificial Intelligence (AI) algorithms and sensors to orient itself in relation to other member LMs in the swarm, as well as acting collectively to search for, engage, and attack multiple targets autonomously as Lethal Autonomous Weapons Systems (LAWS). The advantages of autonomous LMs swarm are the ability to perform distributed combat tasks, group scalability, strong operational flexibility, and battlefield adaptability. The use of fully autonomous low-cost LMs swarm is rapidly changing the battlefield especially in asymmetric warfare, allowing countries with limited funding and non-state actors to achieve air supremacy.

The most critical application of LMs swarm is using them as a low-cost method to conduct SEAD/DEAD missions or saturation attacks utilizing an anti-radiation seeker and high-explosive warhead to strike and saturate enemy air defense system. Typical methods of conducting such missions involve the use of expensive, complex, Airborne Electronic Attack (AEA), tactical fighters, and stealth aircraft to deliver air-to-ground ordnance via electronic warfare (EW) devices and Anti-Radiation Missiles (ARM), which are intended to disable and destroy enemy IADS systems. However, the range of these aircrafts may be significant thus requiring a significant standoff range to avoid the contested airspace, often beyond the effective range of radar systems. On the other hand, stealth aircraft may accomplish such mission with a higher level of survivability but such aircraft are highly expensive assets to own and operate for such missions.

In 2019, Israeli Air Force (IAF) have conducted multiple SEAD/DEAD missions against the Syrian Short-Range Air Defense (SHORAD) Pantsir (SA-22) using the Israeli-made Group 3 semi-autonomous LM named Harop. In 2020, Harop and other loitering munitions have been also utilized by Azerbaijani military to strike and destroy Armenian S-300 and Pantsir systems in Nagorno-Karabakh during September and October of 2020.

During the recent war in Libya, swarms of Turkish-made Group 1 and Group 2 fully-autonomous LMs were used by the Government of National Accord (GNA) to conduct SEAD/DEAD against Haftar Armed Forces (HAF) Pantsir S-1; destroying up to 20 systems and causing total losses of $140 M. This case is considered as the first fully-autonomous combat attack in which LMs were able to find, track and attack targets without human intervention.

Between 2016 to 2022, swarms of Iranian-made Group 3 semi-autonomous LMs are used on weekly basis to conduct number saturation attacks against Saudi air defense systems, penetrating the kingdom's sovereign airspace, and attacking different critical infrastructures such as oil storage plants, water desalination plants, airbases and airports in Abha, Jizan, and Riyadh. Most notably, the major attacks that Saudi Arabia witnessed in Abqaiq and Khurais oil production facilities on the early morning of 14 Sep. 2019 by a swarm of 18 Shahed-136 UAVs launched from Iranian base Shahid Ardestani (Tab-5). Those attacks proved the unmatched capabilities of LM swarms to penetrate and suppress some of the most advanced long-range air defense systems; causing excessive damage and disruption at a strategic level.

Group 4 and Group 5 UCAVs weighting more than 1320 pounds; have proven their ability in supporting High Value Targeting (HVT) missions in Afghanistan, Syria, Iraq, and Yemen establishing a new era of Unmanned aircraft benefits over manned aircraft. Although reconnaissance and strikes against moving targets continue as staple UCAV mission in asymmetric warfare against terrorist groups. For instance, MQ-9s deployed over 1,500 weapons against ISIS in Iraq and Syria on the ground. However, cost and manning requirements are major issues of using such large UCAVs in asymmetric warfare as a single MQ-9 unit can cost upwards of $64 million and requires a highly trained pilot and a sensor operator for as long as it is airborne. Another issue of using large UCAVs is the high possibility of being lost or shot down by surface-to-air missiles. Between 2016 to 2021, more than 26 UCAVs including MQ-9, RQ-4 Global Hawk, MQ-1B, MQ-1C, CH4, and Wing Loong II were lost or shot down in Yemen by basic SA-6 surface-to-air missiles. Thus, using UCAVs may not be as practical nor as cost-effective as a Group 3 STUAS would be for HVT missions in asymmetric warfare.

In High Value Targeting (HVT) missions and Multi-Domain Operations (MDO), organic and lethal airpower provided by Group 3 Small Tactical Unmanned Aircraft System (STUAS) has a great potential to significantly increase the effectiveness and lethality of small units while simultaneously reducing the burden on traditional and expensive tactical fighter aircraft. In addition to their lower operational and acquisition costs, Group 3 STUAS typically have smaller operating footprint as they can be launched by catapults or rail systems, which may also help reduce overall mission signature in high-risk operations. For example, the STUAS operator could fix a target visually, and direct other weapon systems—for example, artillery, helicopters or UCAV to its location but not yet weaponized. However, the US military aims to increase the number of weaponized STUAS from a few hundred to several thousand, allowing the most forward-based troops access to an armed airborne support platform.

To further enhance the synergy between manned and unmanned aircrafts, manned-unmanned teaming (MUM-T) concept was initiated in the early 2000s with the aim to provide ground forces, and pilots in fixed or rotary-wing aircraft better co-ordination and the ability to quickly divide tasks between available assets with the ability to control UASs and their payloads while being interoperable with tactical manned aircraft during Close Air Support (CAS) operations in contested or hostile airspace. As a result, there is an urgent need to develop a new methodology where STUAS & LMs could perform Intelligence, Surveillance, and Reconnaissance (ISR) and strike missions in CAS with direct control from military tactical fighters and helicopters co-pilots while de-risking manned aircraft and crews.

Autonomous & standoff cruise missiles have been also used for interdiction air attacks and SEAD/DEAD missions with decoy, ISR, and jamming capabilities such as Raytheon's miniature air launched decoys including (MALD-J) MALD-N and MALD-X, which are designed to be fired from a F/A-18E/F Super Hornet fighter jet. Another variant is known as MALD-V which is designed to be fired from the Predator Medium-Altitude Long-Endurance (MALE) UCAVs to deceive and neutralize enemy's air defense systems. Some of those missiles are designed to utilize their low observability characteristics and synchronized swarming, using flight profiles that make them hard to detect and engage. This type of swarm attack also has the potential to target multiple objects simultaneously. However, the challenge of determining collateral damage estimates from employing missiles has to be done carefully in order for this type of weapon system to be effective.

Low, Slow and Small (LSS) UAS threats represent a diverse and dynamic threat that most of existing Integrated Air Defense Systems (IADS) and Counter-Unmanned Air System (C-UAS) technologies are facing in modern warfare. The more sophisticated the UAS threats are, the more difficult it is to neutralize them, especially if they are fully autonomously flown in swarms as they are more challenging be detected and engaged. If they were successfully detected by radars, the defending forces typically use high-performance long-range surface-to-air missiles (SAMs) to defeat them, which can lead to a high economic cost of such an engagement since traditional SAMs are designed to engage high-value aerial targets. Currently, the United States and its allies such as Saudi Arabia and United Arab Emirates are heavily dependent on costly IADS to intercept low-cost UAS threats. As of January 2022, Saudi-led coalition forces claimed that they downed up to 859 Iranian-made Group 3 semi-autonomous LMs used by Houthi rebels such as Qasef-2k which costs around $5000 to manufacture in mass production. The use of IADS against such threats is an overkill as a Patriot PAC-3 costs around $3 million. On the other hand, short-range air defense systems (SHORAD) and even legacy anti-aircraft artillery have been used in a few operations to defeat UAS threats but are still inefficient against low-cost UAS threats that are autonomously flown. In recent interceptions, Saudi-led coalition forces have used AIM-120 advanced medium-range air-to-air missile (AM-RAAM) launched from an F-15 tactical fighter to intercept single UAS threat, which was ten times cost-effective. However, it would not be practical in combat scenario to use such tactical fighter with air-to-air missiles for C-UAS operations especially against fully autonomous UAV swarms. Therefore, multiple unmanned air-launched loitering munitions with a standoff range would be an optimal cost-effective C-UAS measure to intercept a single UAS threat or swarms of UAS threats (hit-to kill approach) preventing them from attacking airports, critical facilities, air bases, and IADS.

Thus, a Family of Unmanned Aircraft Systems (FoUAS) platform capable of multi-role strike, decoy, and ISR capabilities with improved operational range is needed to execute offensive operations and missions including SEAD/DEAD missions where tactical fighters and UCAVs may be placed at risk of the enemy's Integrated Air Defense System (IADS), while AEA aircrafts jamming and Air-Launched Cruise Missiles (ALCMs) have limited standoff capabilities. The FoUAS could be also configured for conducting combat and cooperative strikes in High Value Targeting (HVT) missions, Multi-Domain Operations (MDO), and Close Air Support (CAS) missions to replace the use of expensive air-to-surface missiles launched by UCAVs with minimal collateral damage. The FoUAS platform is also capable of performing defensive operations such as C-UAS operations to defeat LSS flying UAS swarms as a cost-effective and an alternative C-UAS measure of using high-performance long-range SAMs, air-to-air missiles, and short-range machine guns.

The description provided above is for the purpose of generally presenting the context of the disclosure. Work of the presently named inventors, to the extent it is described in this background section, as well as aspects of the description which may not otherwise qualify as conventional or generally known at the time of filing, are neither expressly nor impliedly admitted as conventional against the present disclosure.

SUMMARY

One aspect of the present disclosure relates to an apparatus of a low-cost, attritable, and agile Small Tactical Unmanned Aerial System (STUAS) mothership capable of carrying and launching payloads while being autonomously guided via GPS with way-point navigation or semi-autonomously operated via a single or multiple Pilots in Command (PICs) with real-time command and control (C2) link and Satellite Communication (SATCOM). In the terminal phase of the flight, the STUAS mothership could be autonomously guided via multiple on-board internal payloads including Electro-Optical/Infra-Red (EO/IR) camera or seekers, stereo vision sensors, 2D and 3D Light Detection and Ranging (LiDAR), low-cost and lightweight 3D airborne radar; by following the terrain as the STUAS flies above and approximately parallel to the ground to avoid detection by air defense. Then, compares it with satellite images stored on-board of a companion computer in order to determine location in GPS-denied environments. In some high-risk missions, some of the internal payloads such as SATCOM, EO/IR Camera, and 3D airborne radar are replaced with a pre-fragmented blast warhead with highly sensitive proximity fuse. A STUAS having a Maximum take-off weight (MTOW) of 88 pounds to 110 pounds may be an advantageous candidate as a mothership since it is large enough to carry the necessary payloads, but small enough to be launched and controlled by close combat units.

The example apparatus disclosed herein also includes at least two temporarily mounted versatile Small Unmanned Aerial Systems (sUAS) and Precision Strike Loitering Munition (PSLM) with asymmetric and symmetric configurations; being air-launched simultaneously from the disclosed "mothership". Both of the sUAS and PSLM have a MTOW of 20 pounds or less and different radar cross-sections (RCS). They may be equipped with interchangeable payloads including: variants of proximity warheads, onboard companion computer with built-in Reinforcement Learning (RL) and Machine Vision (MV) algorithms, onboard EO/IR seekers, stereo vision sensors, and 2D LiDAR; used for terminal homing guidance, searching, identifying, acquiring, attacking, and destroying multiple targets autonomously. The STUAS mothership, the air-launched sUAS, and the air-launched PSLMs of the example apparatus are designed to perform precision strike, decoy, and Intelligence, Surveillance, and Reconnaissance (ISR) missions (collectively the "Family of Unmanned Aircraft Systems (FoUAS) platform"), against high-value time-sensitive aerial or ground targets.

Another aspect of the present disclosure relates to a method of deploying the disclosed FoUAS platform in SEAD/DEAD missions, the FoUAS platform may be semi-autonomously operated from mobile or non-mobile Ground Control Station (GCS) via a single or multiple PICs simultaneously with real-time C2 link or SATCOM; as a single agent from standoff ranges without having a tactical fighter aircraft conducting the mission and entering into hostile airspace and placed at risk of the enemy's IADS. When used as a single agent, the disclosed FoUAS platform may include the STUAS mothership equipped with EO/IR camera, stereo vision sensors, 3D LiDAR, and 3D airborne radar payloads; flying to and loitering over a "Holding Area" in a location beyond a field-of-range of the enemy's SAM system of the IADS; then, air-launching at least one sUAS and one PSLM simultaneously. The sUAS in this scenario may be used as a Small Air Launched Decoy (SALD) to provide decoy capability of a viable threat initiating the RF-guided missiles and making the fire control radars to pick up the large RCS of the decoy, which results in firing at least 1 SAM to conduct Suppression of Enemy Air Defense System (SEAD); while the Precision Strike Loitering Munition (PSLM) with a pre-fragmented blast warhead and highly sensitive proximity fuse may be used to provide vertical attack capability to conduct Destruction of Enemy Air Defense (DEAD). When used as a swarm team, the disclosed FoUAS platform may include at least two STUAS motherships whereas the first STUAS mothership is equipped with EO/IR seekers, stereo vision sensors, 2D LiDAR sensors, a pre-fragmented blast warhead with highly sensitive proximity fuse; may perform autonomous flight via GPS with way-point navigation to a pre-defined "Holding Area" and air-launching at least two sUAS used as a SALD/decoy flying ahead to conduct SEAD, then the first STUAS mothership may dive vertically to attack the search/acquisition radar conducting DEAD. Whereas the second STUAS mothership is equipped with EO/IR camera, stereo vision sensors, 3D LiDAR, and 3D airborne radar payloads; may perform semi-autonomous flight via real-time C2 link or SATCOM to a pre-defined "Holding Area" and air-launching at least two PSLMs used for striking the other components of the enemy's IADS. Then, the second STUAS mothership may be semi-autonomously guided via a single or multiple PICs to perform damage assessment and ISR missions of the enemy's assets.

Another aspect of the present disclosure relates to a method of deploying the disclosed FoUAS platform in High Value Targeting (HVT) missions or Multi-Domain Operations (MDO) between air and land forces. The present disclosure may be used by joint forces in anti-access/area denial (A2/AD) zones; where a Joint Force Commander (JFC) may command a land forces echelon to utilize the STUAS mothership of disclosed FoUAS to conduct close-range Reconnaissance, Surveillance, and Target Acquisition (RSTA) operations; while simultaneously commanding an air force echelon to use the example PSLMs carried by the mothership to conduct cooperative strike operations against enemy's short-range air defense (SHORAD) systems, tanks, armored vehicles, and ground troops. In this method, the disclosed FoUAS platform may be operated mutually between multiple PICs from both land and air forces with the ability to control the STUAS and the PSLMs simultaneously, via cross-domain command and control C2 link or SATCOM as per NATO Standardization Agreement 4586 STANAG 4586; allowing both air and land forces to share/divide control of the disclosed FoUAS platform. This methodology capitalizes on the strengths of each force while extending tactical operational reach, and lethality of manned assets allowing them to remain outside of the range of enemy defense weapon systems. When used as a swarm team, the disclosed FoUAS platform may include at least two STUAS motherships each is equipped with EO/IR camera, stereo vision sensors, 3D LiDAR, and 3D airborne radar payloads; flying into pre-defined holding areas over A2/AD zones while having each air-launching at least two PSLMs carried each the mothership to conduct cooperative strike operations against enemy's SHORAD systems, tanks, armored vehicles, and ground troops.

Another aspect of the present disclosure relates to a method of deploying the disclosed FoUAS platform as a member of manned-unmanned teaming (MUM-T); in which the Combat Systems Officers (CSO) or co-pilots of military fighters and helicopters act as PICs with the ability to guide and control the FoUAS platform at Level 5 of Interoperability (LOI-5) as per STANAG 4586. New MUM-T concepts from the U.S. Air Force (USAF) aim to incorporate command of the UAS itself into manned aircraft so that the pilot has direct control over its sensors, flight maneuvers, and weapons. This capability has the potential to reduce the dependency on SATCOM-based links while allowing the aircrew with potentially better situational awareness to handle the UAV control instead. In this method, the disclosed FoUAS platform acts as an unmanned partner/wingman leveraging the strengths of both manned and unmanned systems to conduct synergistic combat and collaborative operations during high-risk missions while achieving greater air superiority (AS); as the FoUAS qualifies as a force-multiplier. MUM-T could also enable manned aircraft to operate at standoff ranges while monitoring actions on the battlespace without being in acoustic or visual range and still within range to provide kinetic effects, if required.

Another aspect of the present disclosure relates to a method of deploying the disclosed FoUAS platform in C-UAS operations against Low, Slow, and Small (LSS) tactical level UAS threats (Group 1 to Group 3). Recent advancements in the detection, tracking, and classification of LSS UASs has been achieved by a few C-UAS systems. However, defeating them with non-kinetic methods such as RF-jamming or spoofing is not practical yet, since LSS UASs are typically waypoint-directed and autonomously flying without real-time C2 link. As a result, kinetic methods such as high-performance long-range SAMs, air-to-air missiles, and short-range machine guns are currently being used to intercept UAS threats once they get detected by radars. which turns the cost-benefit ratio of using them upside down and render them inefficient as they are not specifically designed to engage low-cost threats. Therefore, the disclosed FoUAS platform could be used as a cost-effective (hit-to kill)C-UAS tactical technique in which at least two jet-powered Precision Strike Loitering Munitions (PSLM) are used to intercept and defeat (hit-to kill) against Low, Slow and Small (LSS) UAS threats. In an operational scenario against a single UAS threat, the FoUAS platform may be operated as a single agent whereas a STUAS mothership equipped with EO/IR camera, stereo vision sensors, 2D LiDAR, and 3D airborne radar payloads; may be launched by a mobile or non-mobile GCS via a single or multiple PICs simultaneously with real-time C2 link or SATCOM, and flown directly into the expected flight path or trajectory of approaching UAS threat after detecting it by the ground-based air surveillance radars and the on-board 3D airborne radar.

Once the STUAS mothership reaches close proximity with the UAS threat, two jet-powered Precision Strike Loitering Munitions (PSLM) would be air-launched with each having a pre-fragmented blast warhead and highly sensitive proximity fuse to increase the chances of kill. PICs in this case may operate both PSLMS and then for terminal guidance rely on their on-board onboard companion computer; having built-in Reinforcement Learning (RL) and Machine Vision (MV) algorithms processing in real-time the inputs gathered by a combination of onboard EO/IR seekers, stereo vision sensors, and 2D LiDAR to identify, track, and intercept the target and destruct it mid-air effectively without posing danger of intercepting it over cities or close to airports, critical facilities, and air bases. When used as a swarm team, the disclosed FoUAS platform may include at least two STUAS motherships flying into the expected flight path or trajectory of approaching UAS swarm while having each air-launching at least two jet-powered PLSMs to intercept multiple UASs simultaneously and destruct them mid-air effectively. More autonomous motherships and PLSMs could be used against larger number of UAS swarms.

These and other features and characteristics, as well as the methods of deployment and functions of the related elements of structure and the combination of parts and economies of manufacture, will become more apparent upon consideration of the following description and the appended claims with reference to the accompanying drawings, all of which form a part of this specification.

BRIEF DESCRIPTION OF THE DRAWINGS

It should be noted that identical features in different drawings are generally shown with the same reference numeral and like reference numerals designate corresponding parts in the various figures. Various other objects, features and attendant advantages of the present invention will become fully appreciated as the same becomes better understood when considered in conjunction with the accompanying drawings.

It is to be expressly understood, however, that the drawings are for the purpose of illustration and description only and are not intended as a definition of the limits of claims. As used in the specification and in the claims, "a", "an", and "the" include plural referents unless the context clearly dictates otherwise.

In FIG. 1A, the example mothership is depicted as carrying and flying the example sUAS and PSLM to a remote holding area during a first phase of the example SEAD/DEAD mission implemented in accordance with the teachings of this disclosure;

In FIG. 2A, the example mothership is depicted as carrying and flying the example Group1 symmetric payloads to a remote holding area during a first phase of the example SEAD/DEAD mission. Then the STUAS mothership may dive vertically to attack the search/acquisition radar during a fifth phase of the example SEAD/DEAD mission implemented in accordance with the teachings of this disclosure;

In FIG. 2D, the example mothership is depicted as carrying and flying the example Group1 symmetric payloads to a remote holding area during a first phase of the example SEAD/DEAD mission, then the STUAS mothership may perform damage assessment and ISR activities of the enemy's assets during a sixth phase of the example SEAD/DEAD mission implemented in accordance with the teachings of this disclosure;

In FIG. 3A, the example mothership is depicted as carrying and flying the example Group1 symmetric payloads to a remote holding area during a first phase of the example High Value Targeting (HVT) missions, Multi-Domain Operations (MDO), and being a member of manned-unmanned teaming (MUM-T) implemented in accordance with the teachings of this disclosure;

4A illustrates an example apparatus of a Family of Unmanned Aircraft Systems (FoUAS) platform that includes an example attritable Small Tactical Unmanned Aircraft System (STUAS) mothership equipped with internal payloads including EO/IR camera, stereo vision sensors, 2D LiDAR, low-cost 3D airborne radar, and lightweight SATCOM when deployed as a single agent operated from a standoff range; and example Group1 symmetric external payloads including example two jet-powered LMs mounted via two aluminum alloy racks located under the wings of the STUAS mothership.

FIG. 4D illustrates the example Family of Unmanned Aircraft Systems (FoUAS) platform operational scenario example when deployed as a single agent in C-UAS operations against a single LSS UAS threat;

DETAILED DESCRIPTION

The example methods and apparatus described herein provide embodiments to air-launch multiple asymmetric or symmetric small Unmanned Aircraft Systems (sUAS) and Precision Strike Loitering Munition (PSLM); simultaneously from an attritable Small Tactical Unmanned Aircraft System (STUAS) while airborne (collectively the "Family of Unmanned Aircraft Systems (FoUAS) platform"). The disclosed FoUAS platform is configured as a multi-role precision strike, decoy, and ISR standoff platform with the ability to perform as a single agent or a member of a swarm team in offensive operations and missions including SEAD/DEAD missions, High Value Targeting (HVT) missions, Multi-Domain Operations (MDO), and a member of Manned-Unmanned Team (MUM-T) in Close Air Support (CAS) missions. The disclosed FoUAS platform is also configured to act as a single agent or a member of a swarm team in defensive operations such as Counter-Unmanned Air System (C-UAS) against a single or a swarm of Low, Slow and Small-Unmanned Aerial Systems (LSS-UASs) threats; as a cost-effective kinetic (hit-to kill)C-UAS tactical technique.

Figure 1A:
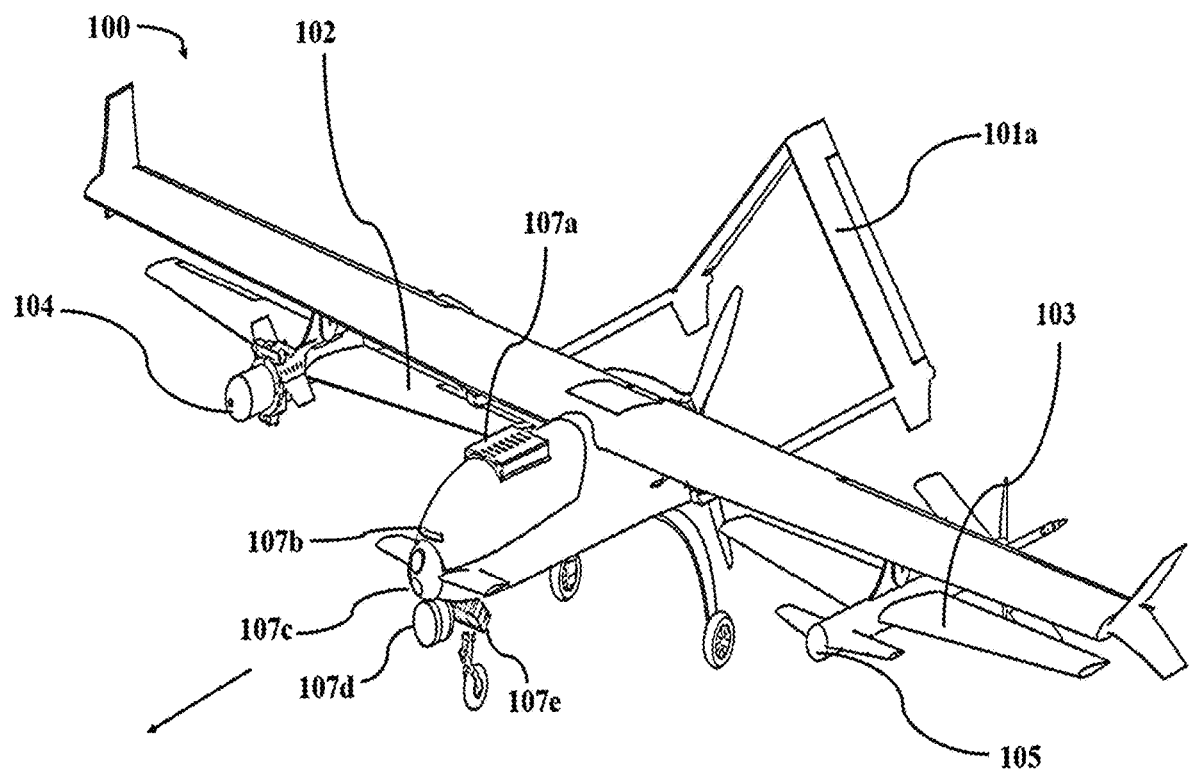
FIG. 1A illustrates an example apparatus of a Family of Unmanned Aircraft Systems (FoUAS) platform that includes an example attritable Small Tactical Unmanned Aircraft System (STUAS) mothership equipped with internal payloads including EO/IR camera, stereo vision sensors, 3D LiDAR, low-cost 3D airborne radar, and lightweight SATCOM when deployed as a single agent; and example external Group1 asymmetric payloads including an example small Unmanned Aircraft Systems (sUAS) and an example Precision Strike Loitering Munition (PSLM) mounted via two aluminum alloy racks located under the wings of the STUAS mothership.

Referring to the drawings, FIG. 1A shows an example apparatus of a Family of Unmanned Aircraft Systems (FoUAS) platform 100 including an example attritable Small Tactical Unmanned Aircraft System (STUAS) 101$a$ utilized as a mothership, and example external asymmetric payloads 102 and 103 carried via two aluminum alloy racks located under the wings of the STUAS 101$a$. The STUAS 101$a$ is made of Commercial-Off-The-Shelf (COTS) materials and sub-systems with a MTOW of 88 pounds to 110 pounds; making it low-cost, attritable, reusable, and agile mothership platform. The disclosed STUAS may be equipped with internal payloads including EO/IR camera 107$c$, stereo vision sensors 107$b$, 3D LiDAR 107$d$, low-cost 3D airborne radar 107$e$, and lightweight SATCOM 107$a$ when deployed as a single agent; capable of carrying and air-launching simultaneously external Group1 asymmetric or symmetric payloads while being autonomously guided via GPS or semi-autonomously guided via a single or multiple Pilots in Command (PICs). The STUAS 101$a$ is further designed to have a low Radar Cross-Section (RCS) by manufacturing most of its components and internal substructures by carbon fiber composite, thereby allowing it to be used in high-risk missions while minimizing its detection by the enemy's fire control radar of IADS. The example Group1 asymmetric payloads of the STUAS 101$a$ include example LM used as PSLM 102 reflecting a low RCS while being electro-optical/infra-red (EO/IR) guided to search for targets or use reconnaissance data from other sources, and attack once a target is located, utilizing an interchangeable warhead 104 that is matched with highly sensitive proximity fuse to conduct destruction of targets. The example asymmetric payloads of the STUAS 101$a$ may also include an example Group 1 sUAS used as a decoy 103 reflecting a large RCS with interchangeable payloads 105 including reflectors, chaff, and luneburg lens, to deceive the enemy's fire control radar of IADS and cause it to fire its SAMs during a second phase of the example mission as implemented in accordance with the teachings of this disclosure.

Figure 1B:
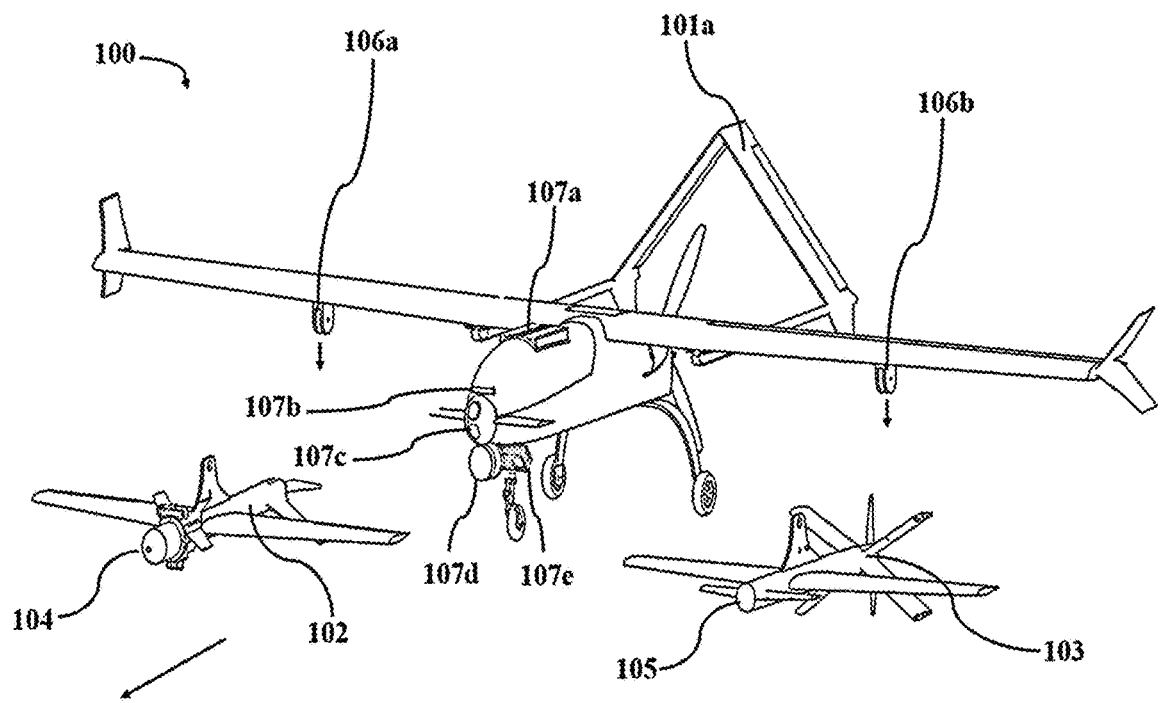
FIG. 1B illustrates an example apparatus of a Family of Unmanned Aircraft Systems (FoUAS) platform deployment of FIG. 1A when the example Group 1 asymmetric payloads including an example 1 sUAS and an example LMs are air-launched simultaneously from the aluminum alloy racks located under the wings of the STUAS mothership during a second phase of the example SEAD/DEAD mission implemented in accordance with the teachings of this disclosure.

As represented in FIG. 1B, an example apparatus of a Family of Unmanned Aircraft Systems (FoUAS) platform 100 deployment of FIG. 1A when the example Group1 asymmetric payloads including an example Group1 sUAS 103 and an example Group1 LM 102 are air-launched simultaneously (as used herein simultaneously includes within the same minute, second or other smaller timeframe such as milliseconds, or 10s or 100s of milliseconds) from the aluminum alloy racks 106 a-b located under the wings of the STUAS mothership 101a during a second phase of the example SEAD/DEAD mission implemented in accordance with the teachings of this disclosure. The Group1 asymmetric payloads may free-fall via gravity to clear out of the STUAS mothership 101a airframe by activating two internally mounted servo motors and a pushrod-control pin lock. It will be appreciated that while the payloads in an asymmetric configuration are different, the weight between the two different payloads may be the same or similar (e.g., so that the flight characteristics of a group 3 UAS are acceptable for use). Alternatively, or in addition, asymmetric payloads may have: 1) the same (including substantially similar) radar cross-sections as discussed herein; or 2) may have different (including substantially different) radar cross-sections as discussed herein (e.g., where one is a sUAS designed as a decoy and the other is a LM designed to attack a target).

Figure 1C:
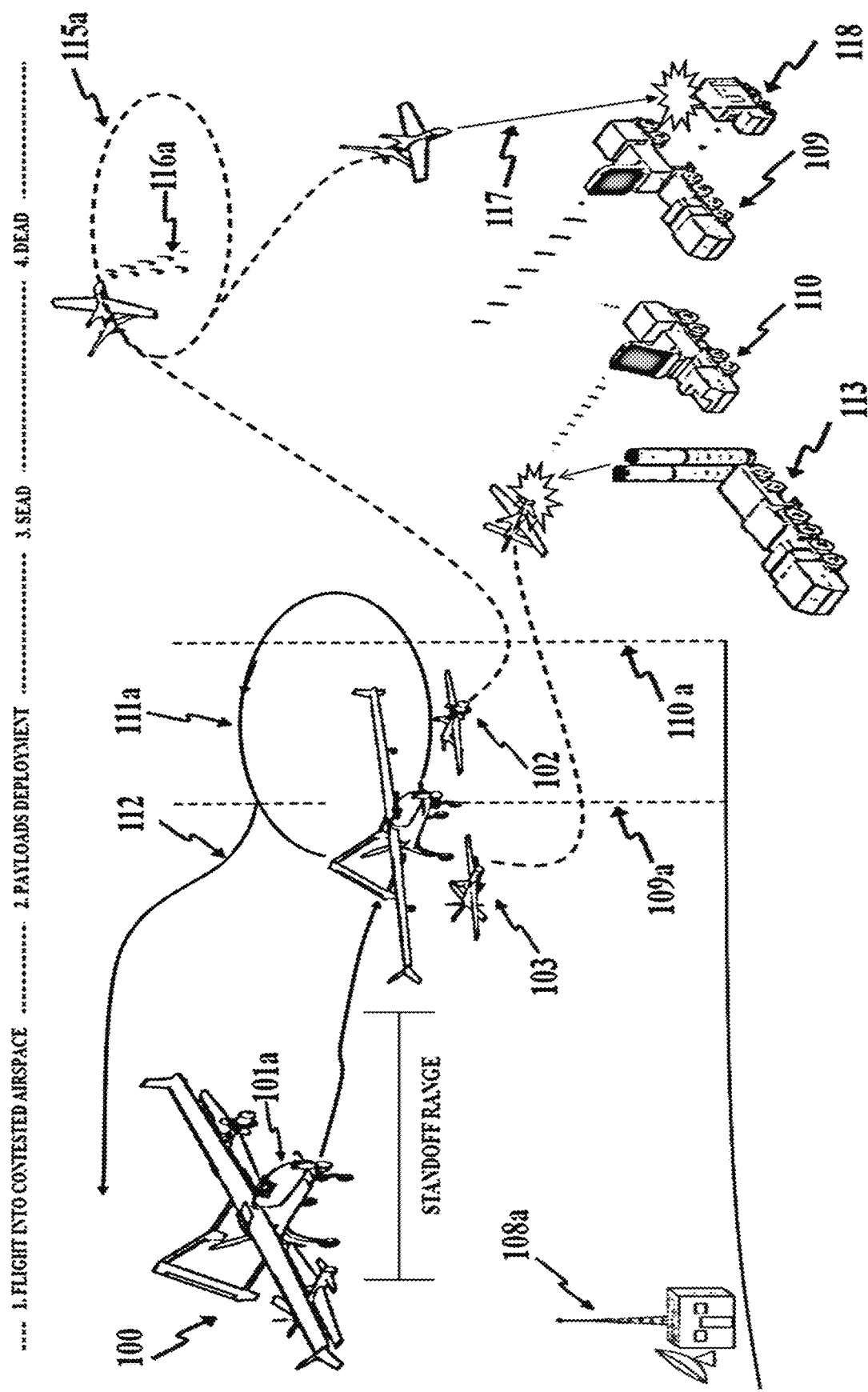
FIG. 1C illustrates the example Family of Unmanned Aircraft Systems (FoUAS) platform operational scenario example of SEAD/DEAD missions when deployed as a single agent operated from a standoff range when the example asymmetric payloads are air-launched simultaneously as illustrated in FIG. 1B including example sUAS acting as Small Air Launched Decoy (SALD) during a third phase of the example SEAD/DEAD mission, and example PSLM conducting DEAD during a fourth phase of the example SEAD/DEAD mission implemented in accordance with the teachings of this disclosure.

The embodiments disclosed herein allow a novel method of executing Suppression/Destruction of Enemy Air Defense (SEAD/DEAD) missions against an example Integrated Air Defense System (IADS) as shown in FIG. 1C. In this regard, the novel method can be viewed as an operational scenario example of the disclosed FoUAS platform 100 deployment as a single agent which is broadly summarized by four phases herein: the first phase may include the flight into contested airspace where an example Family of Unmanned Aircraft Systems (FoUAS) platform 100 is deployed from a standoff range as a single agent being semi-autonomously guided via GPS or SATCOM, flying at a very low attitude of less than 100 feet AGL depending on terrain while following a preprogrammed route into the enemy's target search/acquisition radar 109 detection range 109a; then loitering at a pre-defined "Holding Area" 111a based on prior intelligence gathered regarding the expected radar site location while loitering beyond a field-of-range 110a of the enemy's fire control radar 110 of the IADS. The second phase may include, STUAS 101a air-launching simultaneously the example Group 1 LM 102 and the example Group1 sUAS 103, and return to launch point following a preprogrammed route 112. As represented in FIG. 1C, the third phase may include the example Group1 sUAS 103 flying into the fire control radar range 110a acting as a SALD/decoy to make the radar 110 to pick up its large RCS, which attracts approaching SAM 113 towards itself, resulting in achieving Suppression of Enemy Air Defense System (SEAD) 114. The fourth phase may include deploying the example Group1 LM 102 used as a PSLM after being air-launched from the STUAS 101a, the PIC from a fixed Ground Control Station (GCS) 108a would fly it to a holding area 115a in the opposite direction of the enemy's fire control radar 110 in a desired flight profile to identify the exact IADS launch site 116a. Then, the example PSLM 102 gain airspeed and dive vertically with a small angle of attack and max speed 117 to strike the Command Module 118 of the IADS. A detailed flow chart of this deployment method steps is of highlighted in FIG. 1D.

Figure 1D:
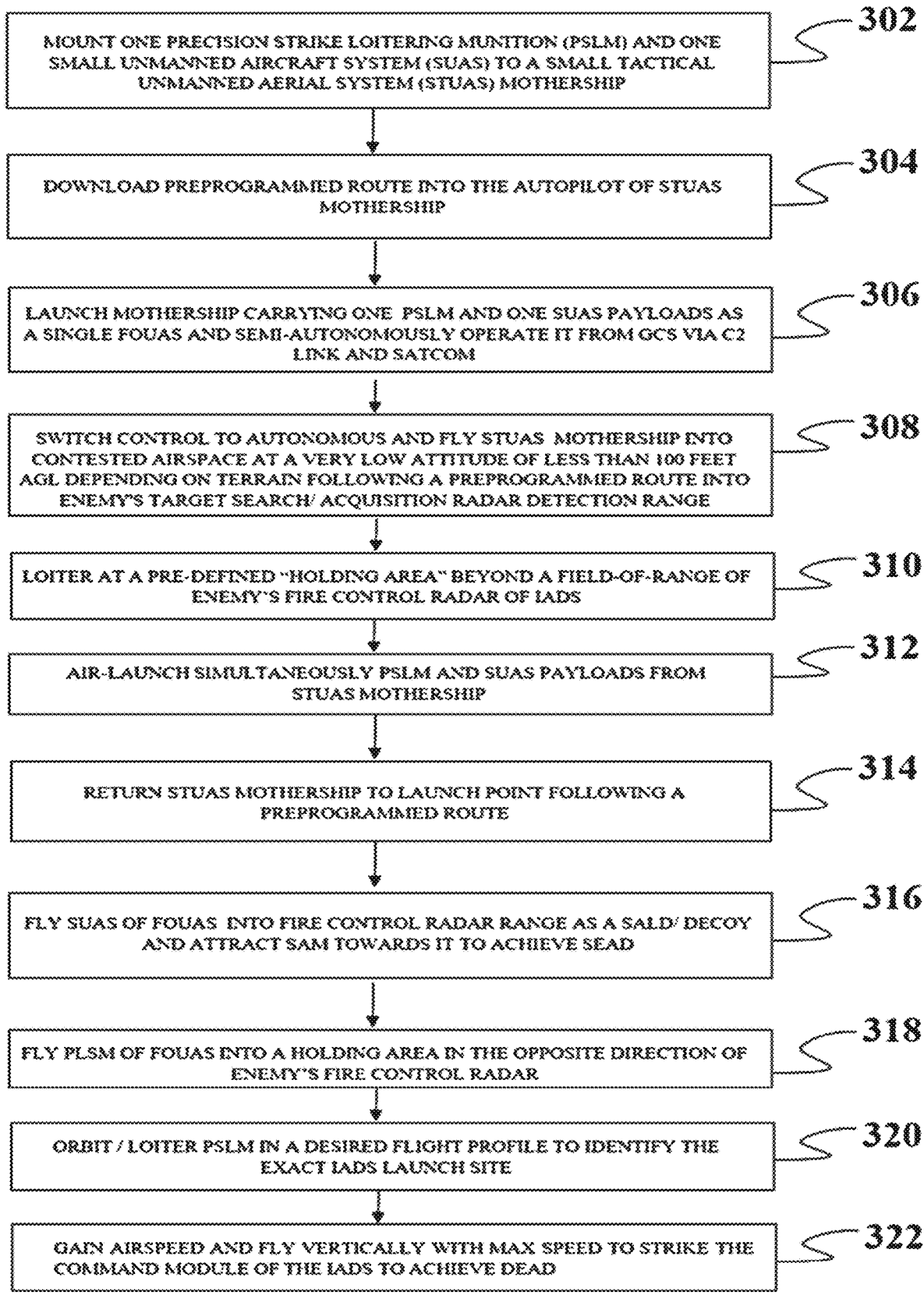
FIG. 1D illustrates a flow chart of deployment method steps of the example Family of Unmanned Aircraft Systems (FoUAS) platform operational scenario example of FIG. 1C.

As represented in FIG. 1D At 302, one PSLM and one sUAS are mounted to a STUAS mothership. At 304, a preprogrammed route is downloaded into the autopilot of STUAS mothership. At 306, the STUAS mothership is launched and carrying one PSLM and one sUAS payloads as a single FoUAS and semi-autonomously operated it from a GCS via C2 link and SATOM during the first phase of the mission. At 308, the control is switched to autonomous and STUAS mothership flown into contested airspace at a very low attitude of less than 100 fF2aeet AGL depending on terrain following a preprogrammed route into enemy's target search/acquisition radar detection range. At 310, the STUAS mothership loiters over a pre-defined "holding area" beyond a field-of-range of enemy's fire control radar of IADS. At 312, the STUAS mothership air-launches simultaneously PSLM and sUAS payloads during the second phase of the mission. At 314, the STUAS mothership is returned to launch point following a preprogrammed route. At 316, the sUAS of FoUAS flies into the fire control radar range as a SALD/decoy and attract SAM towards it to achieve SEAD during the third phase of the mission. At 318, the PSLM of FoUAS flies into a holding area in the opposite direction of enemy's fire control radar. At 320, the PSLM of FoUAS orbits/loiters in a desired flight profile to identify the exact IADS launch site. At 322, the PSLM of FoUAS gains airspeed and flies vertically with max speed to strike the command module of the IADS to achieve DEAD during the fourth phase of the mission.

Figure 2A:
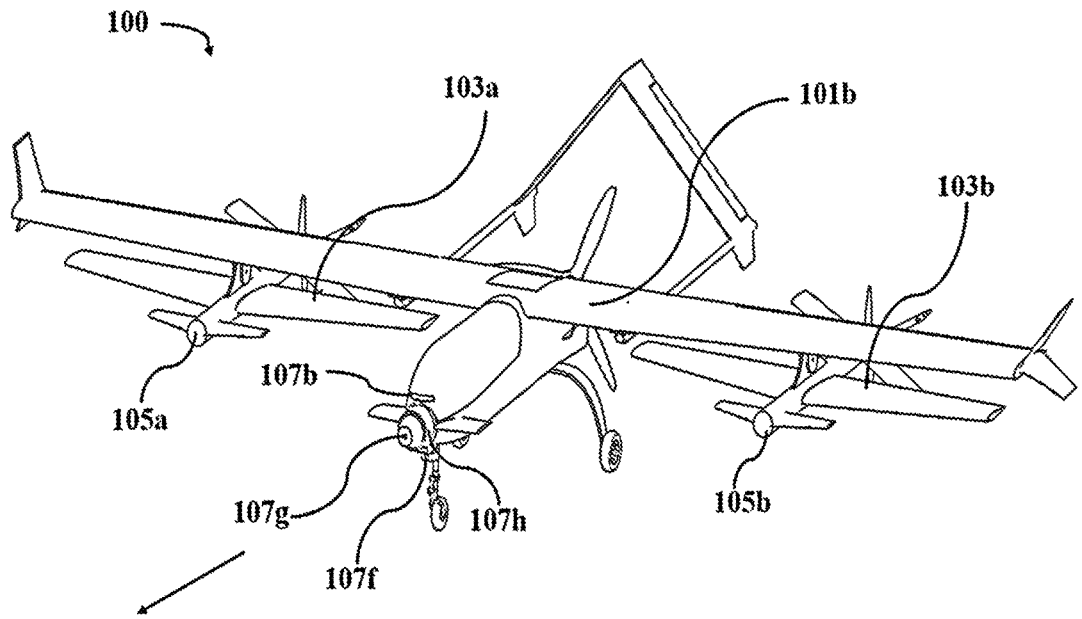
FIG. 2A illustrates an example apparatus of a Family of Unmanned Aircraft Systems (FoUAS) platform that includes an example attritable Small Tactical Unmanned Aircraft System (STUAS) mothership for SEAD/DEAD missions when deployed as a member of swarm team in which the internal payloads such as SATCOM, EO/IR Camera, and 3D airborne radar are replaced with a pre-fragmented blast warhead with highly sensitive proximity fuse; and example symmetric external payloads including example two sUAS used as a SALD/decoys mounted via two aluminum alloy racks located under the wings of the STUAS mothership.

Referring to the drawings, FIG. 2A shows an example apparatus of a Family of Unmanned Aircraft Systems (FoUAS) platform 100 including an example attritable Small Tactical Unmanned Aircraft System (STUAS) 101b utilized as a loitering munition mothership, and example external symmetric payloads including two sUAS used as a SALD 103a-b carried via two aluminum alloy racks located under the wings of the STUAS 101b. The STUAS 101b is made of Commercial-Off-The-Shelf (COTS) materials and sub-systems with a MTOW of 88 pounds to 110 pounds; making it low-cost, attritable, reusable, and agile mothership platform. The disclosed STUAS 101b may be equipped with internal payloads including EO/IR seekers 107g, stereo vision sensors 107b, 2D LiDAR 107f, and a pre-fragmented blast warhead with highly sensitive proximity fuse 107h to conduct destruction of targets when deployed as a member of swarm team of the example SEAD/DEAD mission.

Figure 2B:
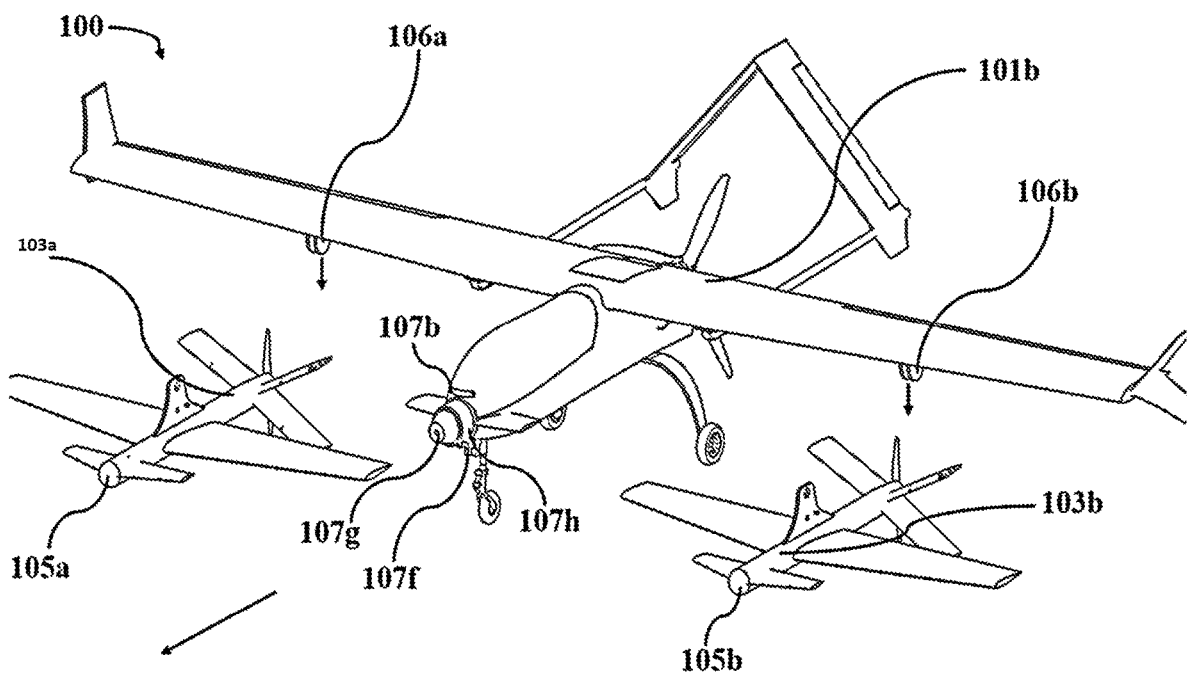
FIG. 2B illustrates an example apparatus of a Family of Unmanned Aircraft Systems (FoUAS) platform deployment of FIG. 2A when the Group 1 symmetric external payloads including two sUAS used as a SALD/decoys are air-launched from the aluminum alloy racks located under the wings of the STUAS mothership during a second phase of the example SEAD/DEAD mission when deployed as a member of a swarm team implemented in accordance with the teachings of this disclosure.

As represented in FIG. 2B, an example apparatus of a Family of Unmanned Aircraft Systems (FoUAS) platform 100 deployment of FIG. 2A when example Group1 symmetric payloads including two sUAS used as a SALD 103a-b are air-launched simultaneously from the aluminum alloy racks 106 a-b located under the wings of the STUAS mothership 101b during a second phase of the example SEAD/DEAD mission when deployed as a member of swarm team.

The symmetric payloads may free-fall via gravity to clear out of the STUAS mothership 101b airframe by activating two internally mounted servo motors and a pushrod-control pin lock.

Figure 2C:
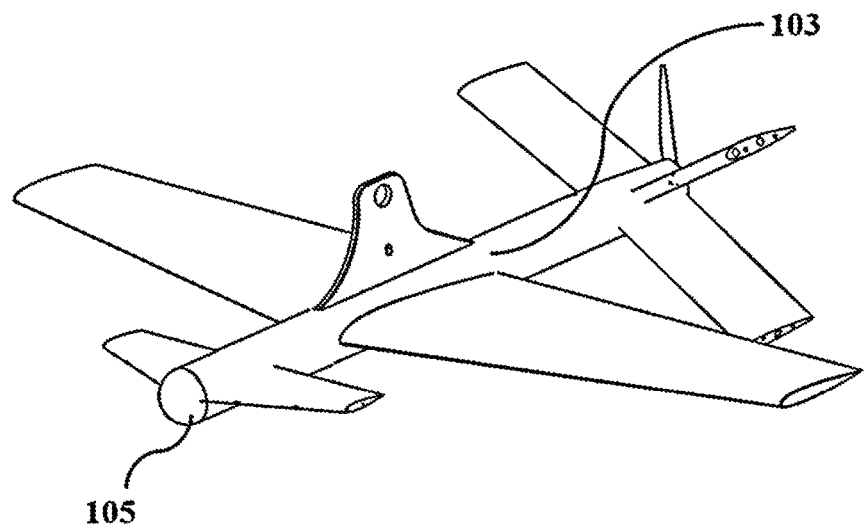
FIG. 2C illustrates an example apparatus of external payload of Group1 sUAS used as a SALD/decoys deployment in FIG. 2B during a third phase of the example SEAD/DEAD mission implemented in accordance with the teachings of this disclosure.

As represented in FIG. 2C, an example apparatus of external payload of small sUAS 103 reflecting a large RCS used as a SALD/decoy with interchangeable payloads 105 including reflectors, chaff, and luneburg lens, to deceive the enemy's fire control radar of IADS and cause it to fire its SAMs during a second phase or a third phase of the example SEAD/DEAD missions as implemented in accordance with the teachings of this disclosure.

Figure 2D:
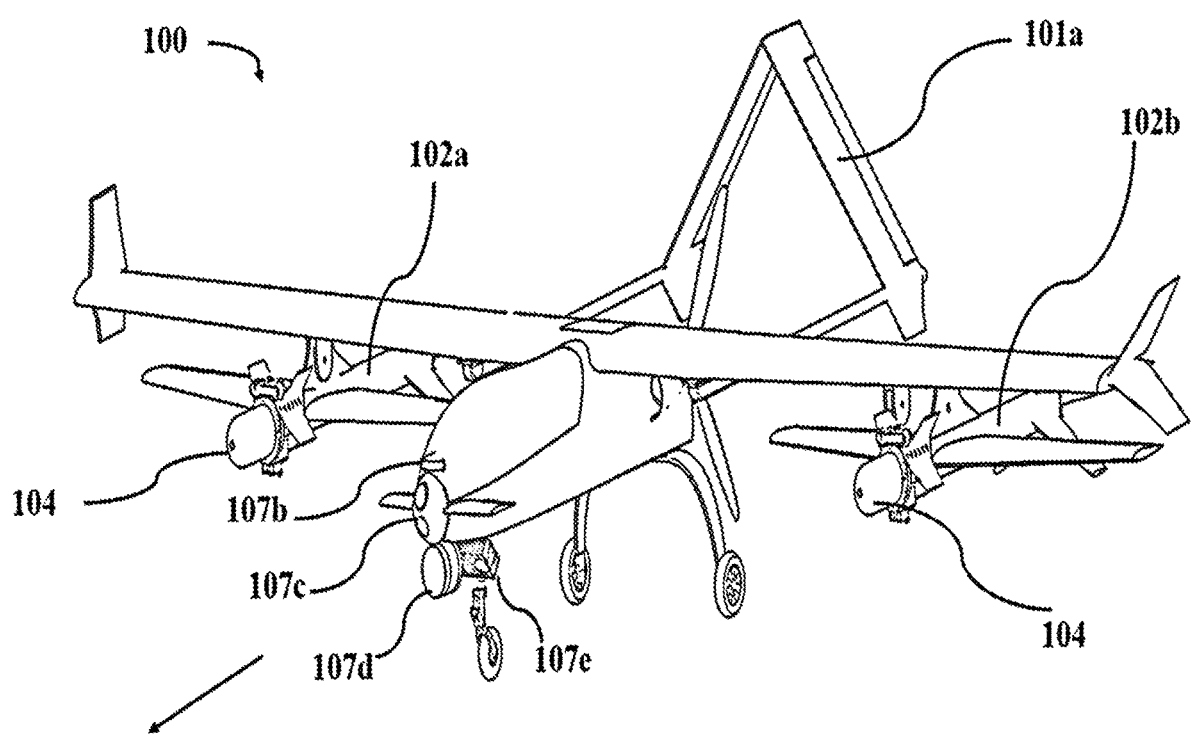
FIG. 2D illustrates an example apparatus of a Family of Unmanned Aircraft Systems (FoUAS) platform that includes an example attritable Small Tactical Unmanned Aircraft System (STUAS) mothership equipped with internal payloads including EO/IR camera, stereo vision sensors, 3D LiDAR, and low-cost 3D airborne when deployed as a member of swarm team; and example Group 1 symmetric external payloads including example two LMs used as Precision Strike Loitering Munition (PSLM) mounted via two aluminum alloy racks located under the wings of the STUAS mothership.

As represented in FIG. 2D, an example apparatus of a Family of Unmanned Aircraft Systems (FoUAS) platform 100 including an example attritable Small Tactical Unmanned Aircraft System (STUAS) 101a utilized as a mothership, and example Group1 external symmetric payloads including two PSLMs 102*a-b* carried via two aluminum alloy racks located under the wings of the STUAS 101*a*. The STUAS 101*a* is made of Commercial-Off-The-Shelf (COTS) materials and sub-systems with a MTOW of 88 pounds to 110 pounds; making it low-cost, attritable, reusable, and agile mothership platform. The disclosed STUAS may be equipped with internal payloads including EO/IR camera 107*c*, stereo vision sensors 107*b*, 3D LiDAR 107*d*, and a low-cost 3D airborne radar 107*e*; to conduct damage assessment and ISR activities of the enemy's assets during the example SEAD/DEAD mission when deployed as a member of swarm team.

Figure 2E:
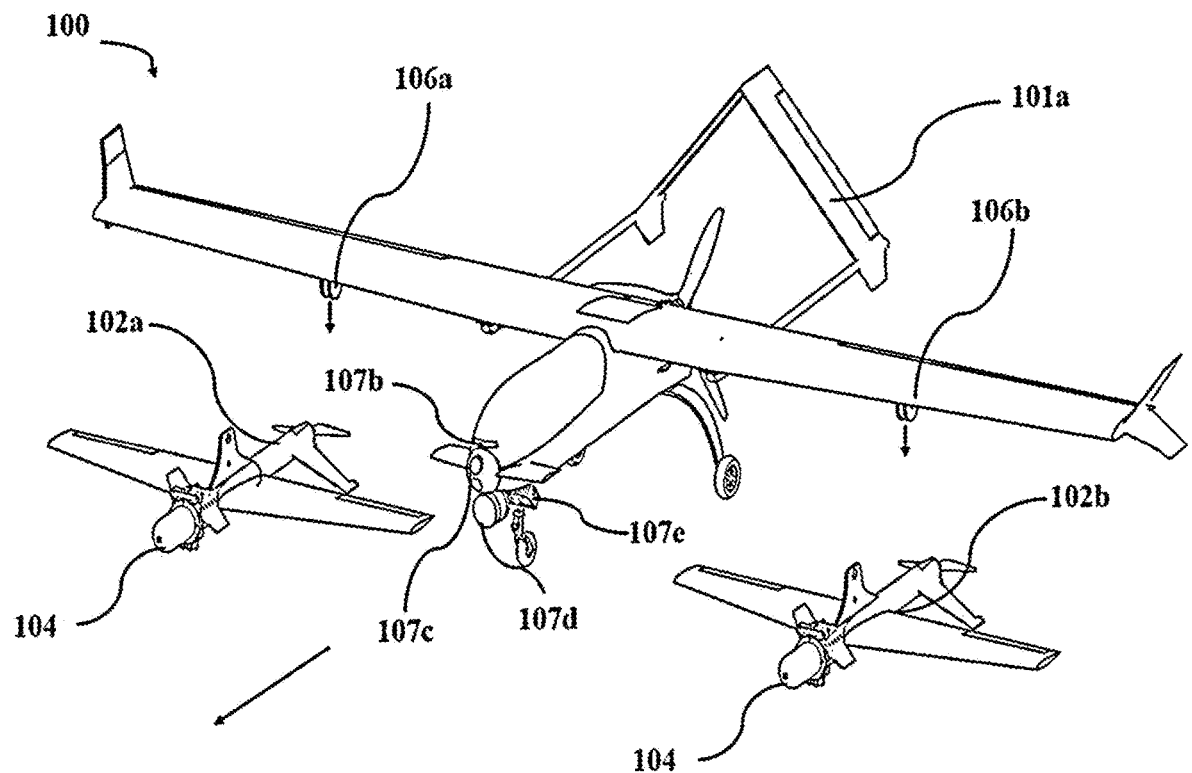
FIG. 2E illustrates an example apparatus of a Family of Unmanned Aircraft Systems (FoUAS) platform deployment of FIG. 2D when the symmetric external payloads including two Precision Strike Loitering Munition (PSLM) are air-launched simultaneously from the aluminum alloy racks located under the wings of the STUAS mothership during a fourth phase of the example SEAD/DEAD mission when deployed as a member of a swarm team implemented in accordance with the teachings of this disclosure.

As represented in FIG. 2E, an example apparatus of a Family of Unmanned Aircraft Systems (FoUAS) platform 100 deployment of FIG. 2D when the example Group1 external symmetric payloads including two PSLMs 102*a-b* are air-launched simultaneously from the aluminum alloy racks 106 *a-b* located under the wings of the STUAS mothership 101*a* during a fourth phase of the example SEAD/DEAD mission when deployed as a member of a swarm team. The symmetric payloads may free-fall via gravity to clear out of the STUAS mothership 101*a* airframe by activating two internally mounted servo motors and a pushrod-control pin lock.

Figure 2F:
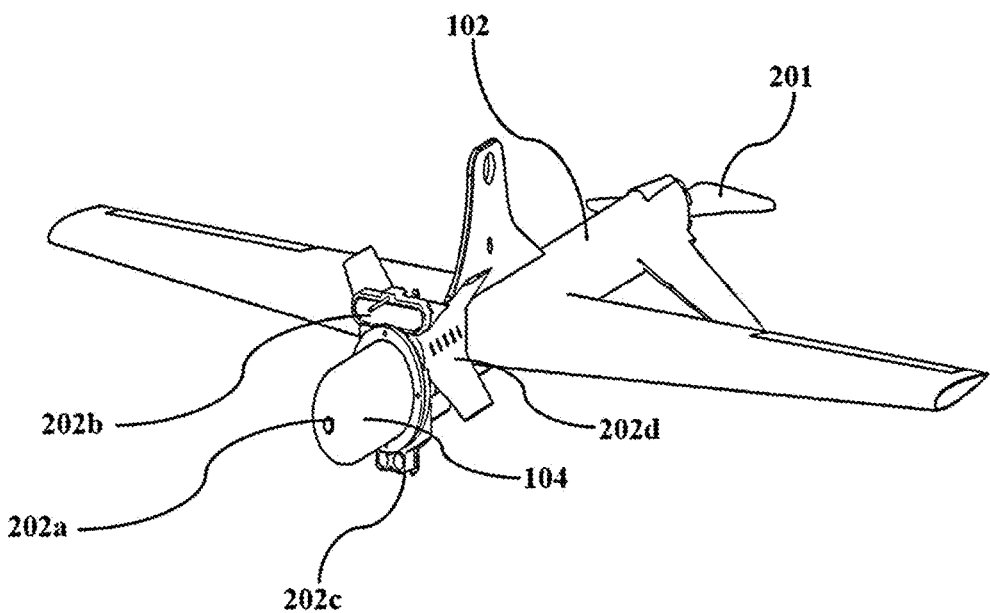
FIG. 2F illustrates an example apparatus of external payload of Group1 LMs used as PSLMs during deployment in FIG. 2E in a fifth phase of the example SEAD/DEAD mission implemented in accordance with the teachings of this disclosure.

As represented in FIG. 2F, an example apparatus of external payload of PSLM 102 reflecting a low RCS and having a small electric motor 201 to reflect a small heat signature. The PSLM 102 may be equipped with Commercial off-the-shelf (COTS) onboard companion computer 202*d* having built-in Reinforcement Learning (RL) and Machine Vision (MV) algorithms processing in real-time the inputs gathered by a combination of onboard EO/IR seekers 202*a*, stereo vision sensors 202*b*, and 2D Light Detection and Ranging (LiDAR) 202*c* used for terminal homing guidance along with searching, identifying, and tracking multiple targets autonomously. The PSLM 102 may be also equipped with a High Explosive Fragmentation (HEF) proximity warhead 104 used for attacking the smaller components of the enemy's IADS.

Figure 2G:
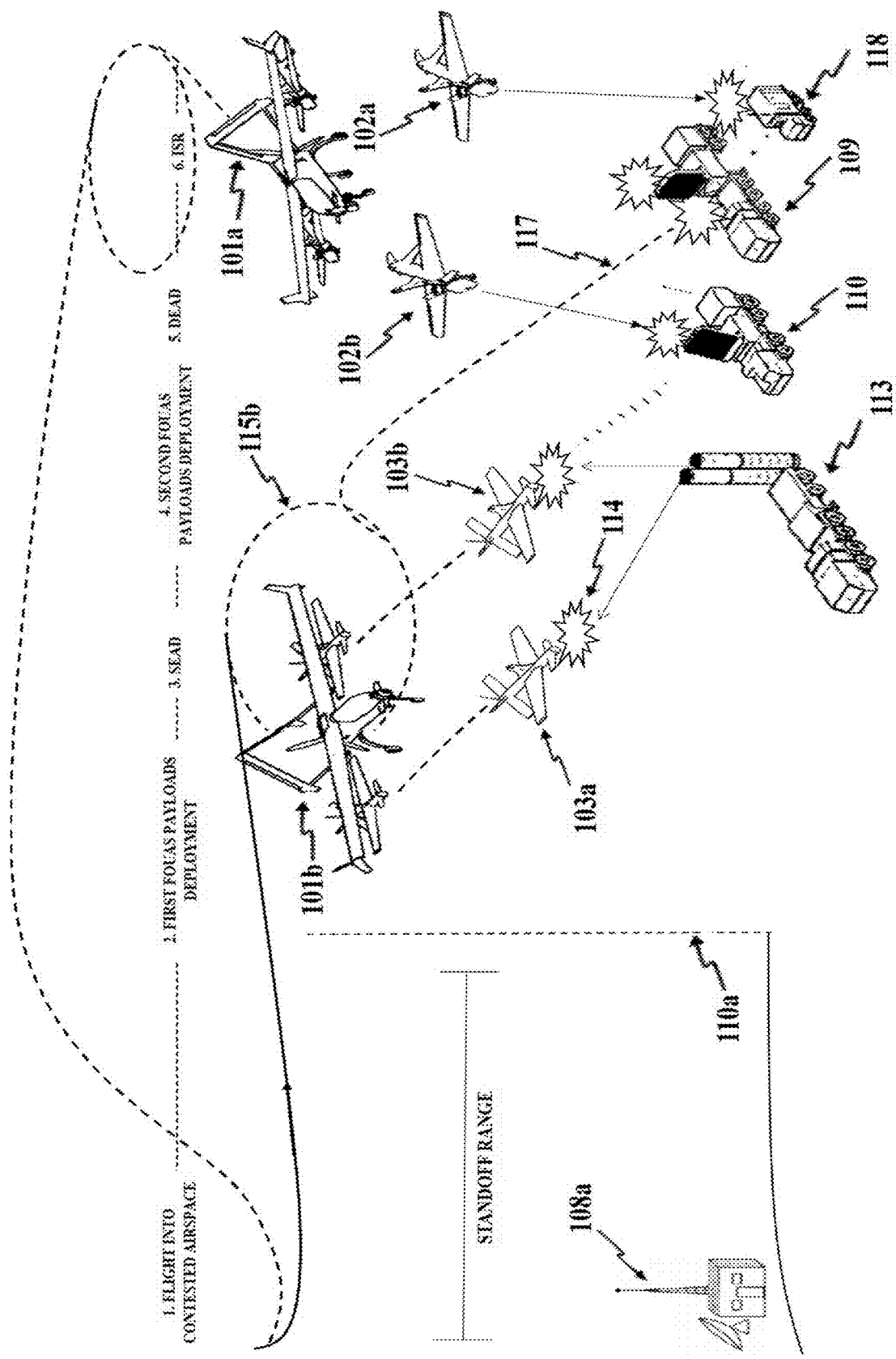
FIG. 2G illustrates the example Family of Unmanned Aircraft Systems (FoUAS) platform operational scenario example of SEAD/DEAD missions when deployed as a member of swarm team operated from a standoff range. Whereas the first FoUAS platform illustrated in FIG. 2B air-launching at least two Group1 sUAS used as a SALD/decoys to conduct SEAD during a third phase of the example SEAD/DEAD mission. While the second FoUAS platform illustrated in FIG. 2E air-launching at least two Group1 LMs used as PSLMs to strike the other components of the enemy's IADS during a fifth phase of the example SEAD/DEAD mission. Then, the STUAS mothership illustrated in FIG. 2B may dive vertically to attack the search/acquisition radar during a fifth phase of the example SEAD/DEAD mission. While the STUAS mothership illustrated in FIG. 2E may be semi-autonomously guided via a single or multiple PICs to perform damage assessment and ISR missions of the enemy's assets during a sixth phase of the example SEAD/DEAD mission implemented in accordance with the teachings of this disclosure.

Another novel method of executing SEAD/DEAD missions against an example IADS as shown in FIG. 2G illustrating the example FoUAS 100 platform operational scenario example as a swarm team while being operated from a standoff range. This operational scenario is broadly summarized by six phases herein: the first phase may include the flight into contested airspace where an example Family of Unmanned Aircraft Systems (FoUAS) platform 100 is deployed as swarm team consisting of at least two STUAS 101*a* and 101*b* being semi-autonomously guided via GPS 107 with the support of at least two PICs commanding them directly into the fire control radar range 110*a* from a fixed GCS 108*a* following a preprogrammed route. The second phase may include the first STUAS 101*b* flying at a higher attitude of more than 100 feet AGL depending on terrain, air-launching simultaneously two symmetric sUAS 103 *a-b*. This phase also includes the second STUAS 101*a* flying at a very low attitude of less than 100 feet AGL depending on terrain, in the opposite direction of the enemy's fire control radar 110. Then, the first STUAS 101*b* orbit/loiter in a desired flight profile 115*b* to identify the exact IADS launch site while the while the second STUAS 101*a* keeps loitering at a pre-defined "holding area" beyond a field-of-range of enemy's fire control radar of IADS. As represented in FIG. 2G, a third phase may include at least the example STUAS 101*b* loitering over 113b of the IADS site along with two sUAS 103 *a-b* flying in close proximity of the IADS fire control radar 110, to attract at least three SAMs 113 towards them. Thus, overwhelming the enemy as a force multiplier and achieving Suppression of Enemy Air Defense System (SEAD) 114. The fourth phase may include air-launching simultaneously two Precision Strike Loitering Munition (PSLM) 102 *a-b* from the STUAS 101*a* after identifying the exact IADS launch site. The fifth phase may include the STUAS 101*b* gaining airspeed and diving vertically with a small angle of attack and 117 to strike the target search/acquisition radar 109 of the IADS. Then, one PSLM 102*a* strikes the Command Module 118 while the other PSLM 102*b* strikes the fire control radar 110 of the IADS with real-time direction from PIC (man-in-the-loop, or MITL), resulting on full destruction of the enemy's radar systems. The sixth phase may include the STUAS 101*a* conducting damage assessment and ISR activities of the enemy's assets surrounding the IADS site during the sixth phase of the mission. A detailed flow chart of the steps of this deployment method is of highlighted in FIG. 2H.

Figure 2H:
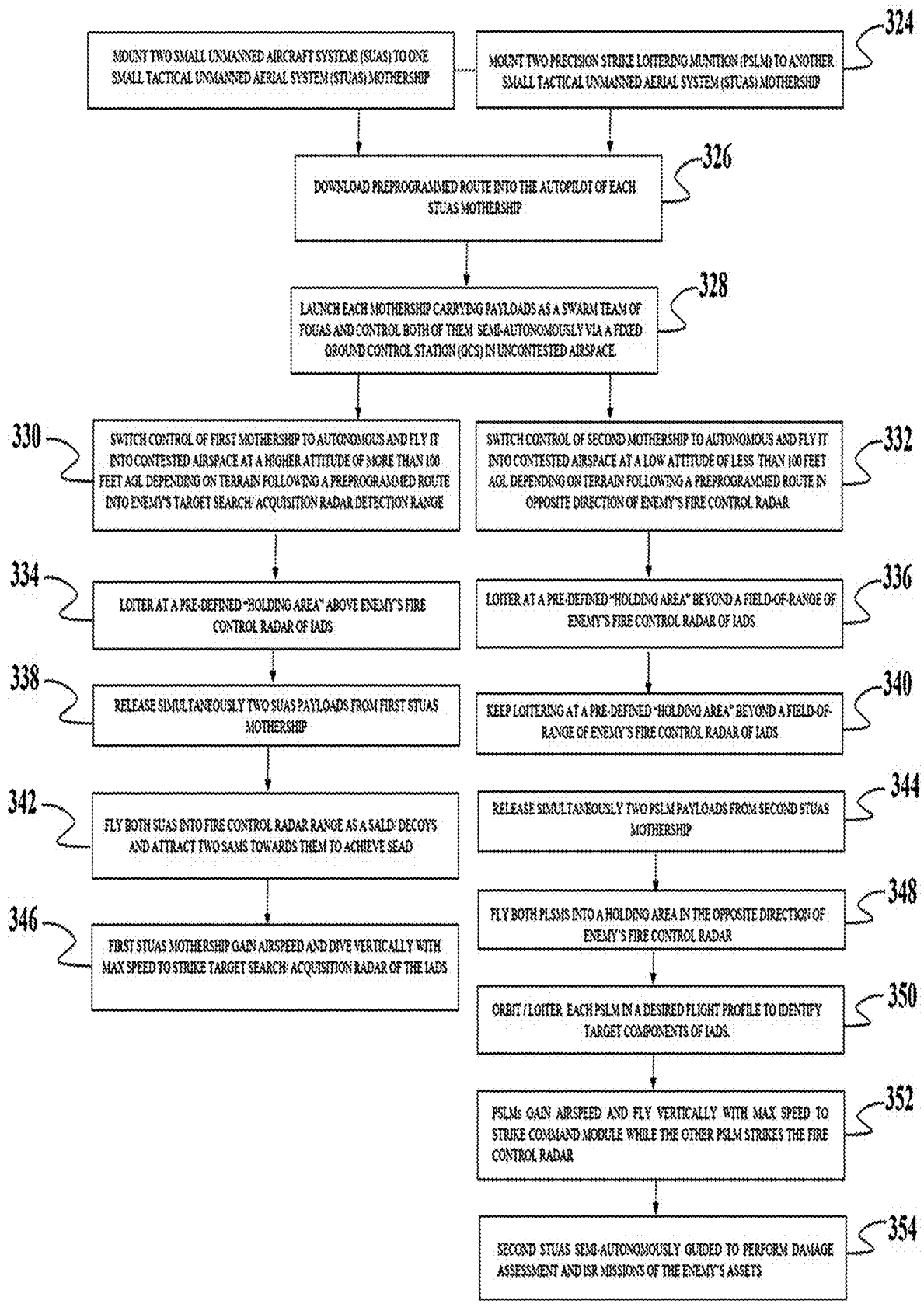
FIG. 2H illustrates a flow chart of deployment method steps of the example Family of Unmanned Aircraft Systems (FoUAS) platform operational scenario example of FIG. 2G.

As represented in FIG. 2H At 324, two PSLM and two sUAS are mounted to two STUAS motherships. At 326, a preprogrammed route is downloaded into the autopilot of both STUAS motherships. At 328, both of the STUAS motherships are launched with the first mothership is carrying two sUAS and the second mothership is carrying two PSLM as a single FoUAS and semi-autonomously operated it from a GCS via C2 link and SATOM during the first phase of the mission. At 330, the control of the first STUAS mothership is switched to autonomous and flown into contested airspace at a higher attitude of more than 100 feet AGL depending on terrain following a preprogrammed route into enemy's target search/acquisition radar detection range. At 332, the control of the second STUAS mothership is switched to autonomous and flown into contested airspace at a low attitude of less than 100 feet AGL depending on terrain following a preprogrammed route in opposite direction of enemy's fire control radar. At 334, the first STUAS mothership loiters over a pre-defined "holding area" above enemy's fire control radar of IADS. At 336, the second STUAS mothership loiters over a pre-defined "holding area" beyond a field-of-range of enemy's fire control radar of IADS. At 338, the first STUAS mothership air-launches simultaneously two sUAS during the second phase of the mission. At 340, the second STUAS mothership keeps loitering at a pre-defined "holding area" beyond a field-of-range of enemy's fire control radar of IADS following a preprogrammed route. At 342, both of the two sUAS of the first STUAS mothership fly into the fire control radar range as a SALD/decoys and attract at least two SAMs towards them to achieve SEAD during the third phase of the mission. At 344, the second STUAS mothership air-launches simultaneously two PSLMs during the fourth phase of the mission. At 346, the first STUAS mothership gains airspeed and dive vertically with max speed with a small angle of attack to strike the target search/acquisition radar of the IADS during the fifth phase of the mission. At 348, both PSLMs of the second STUAS mothership fly into a holding area in the opposite direction of enemy's fire control radar. At 350, both PSLMs of the second STUAS mothership orbit/loiter in a desired flight profile to identify the exact IADS launch site. At 352, both PSLMs gain airspeed and fly vertically with max speed to strike the command module and the fire control radar of the IADS to achieve DEAD during the fifth phase of the mission. At 354, the second STUAS mothership is semi-autonomously guided to conduct damage assessment and ISR activities of the enemy's assets surrounding the IADS site during the sixth phase of the mission.

Figure 3A:
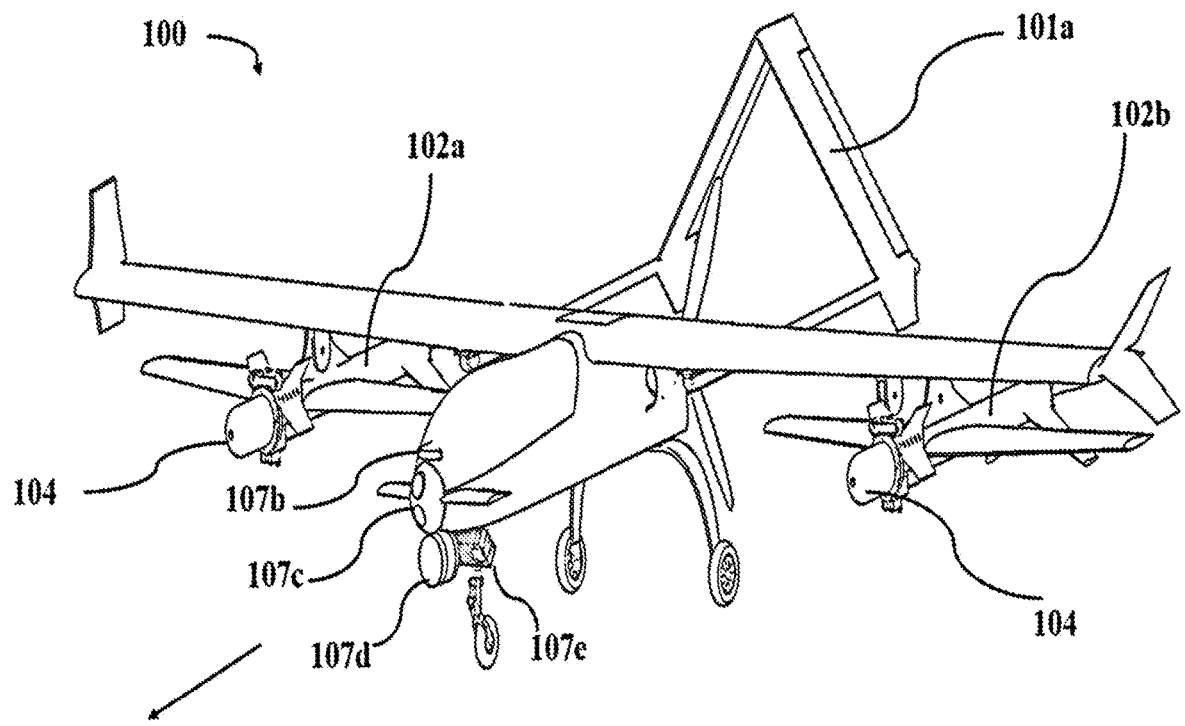
FIG. 3A illustrates an example apparatus of a Family of Unmanned Aircraft Systems (FoUAS) platform that includes an example attritable Small Tactical Unmanned Aircraft System (STUAS) mothership equipped with internal payloads including EO/IR camera, stereo vision sensors, 3D LiDAR, and low-cost 3D airborne radar when deployed as a single agent operated from a standoff range; and example Group1 symmetric external payloads including example two LMs used as PSLMs mounted via two aluminum alloy racks located under the wings of the STUAS mothership.

As represented in FIG. 3A, an example apparatus of a Family of Unmanned Aircraft Systems (FoUAS) platform 100 including an example attritable Small Tactical Unmanned Aircraft System (STUAS) 101*a* utilized as a mothership, and example external symmetric payloads including two PSLMs 102*a-b* carried via two aluminum alloy racks located under the wings of the STUAS 101*a*. The STUAS 101*a* is made of Commercial-Off-The-Shelf (COTS) materials and sub-systems with a MTOW of 88 pounds to 110 pounds; making it low-cost, attritable, reusable, and agile mothership platform. The disclosed STUAS may be equipped with internal payloads including EO/IR camera 107*c*, stereo vision sensors 107*b*, 3D LiDAR 107*d*, and a low-cost 3D airborne radar 107*e*; to conduct low-altitude ISR during the example High Value Targeting (HVT) missions, Multi-Domain Operations (MDO), and being a member of manned-unmanned teaming (MUM-T).

Figure 3B:
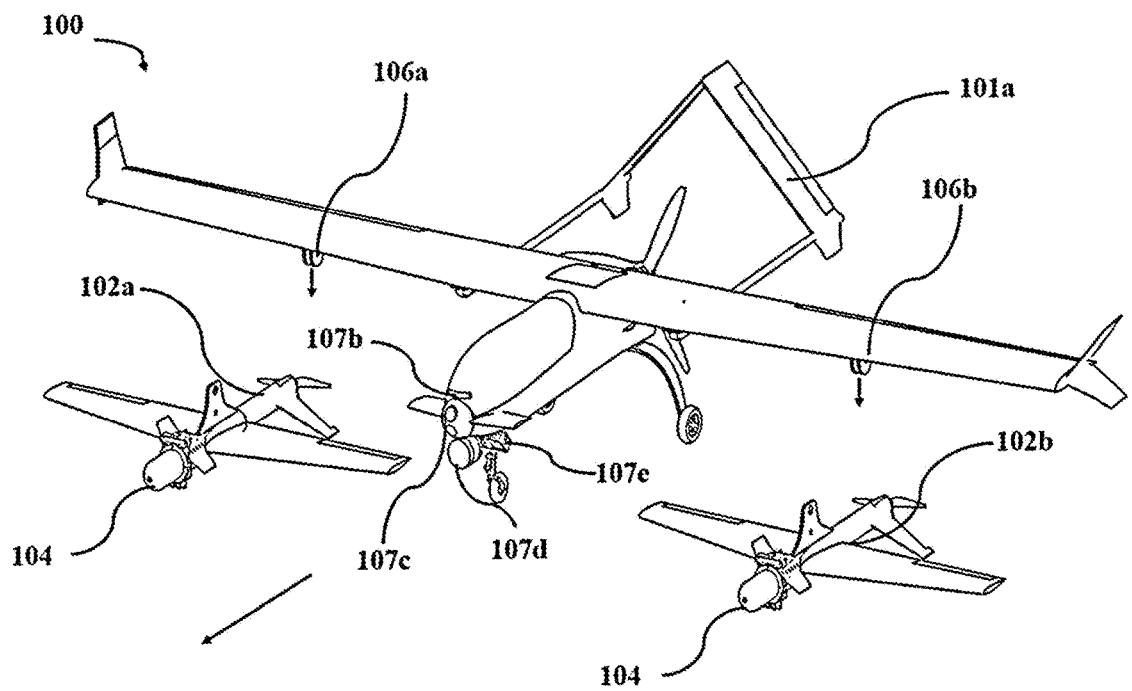
FIG. 3B illustrates an example apparatus of a Family of Unmanned Aircraft Systems (FoUAS) platform deployment of FIG. 3A when Group1 symmetric external payloads including two LMs are used as PSLMs being released via gravity from the aluminum alloy racks located under the wings of the STUAS mothership during a second phase of the example High Value Targeting (HVT) missions, Multi-Domain Operations (MDO), and being a member of manned-unmanned teaming (MUM-T) implemented in accordance with the teachings of this disclosure.

As represented in FIG. 3B, an example apparatus of a Family of Unmanned Aircraft Systems (FoUAS) platform 100 deployment of FIG. 3A when the example Group1 external symmetric payloads including two PSLMs 102*a-b* are air-launched simultaneously from the aluminum alloy racks 106 *a-b* located under the wings of the STUAS mothership 101*a* during a fourth phase of the example High Value Targeting (HVT) missions, Multi-Domain Operations (MDO), and being a member of manned-unmanned teaming (MUM-T) when deployed as a single agent or member of a swarm team. The symmetric payloads may free-fall via gravity to clear out of the STUAS mothership 101*a* airframe by activating two internally mounted servo motors and a pushrod-control pin lock.

Figure 3C:
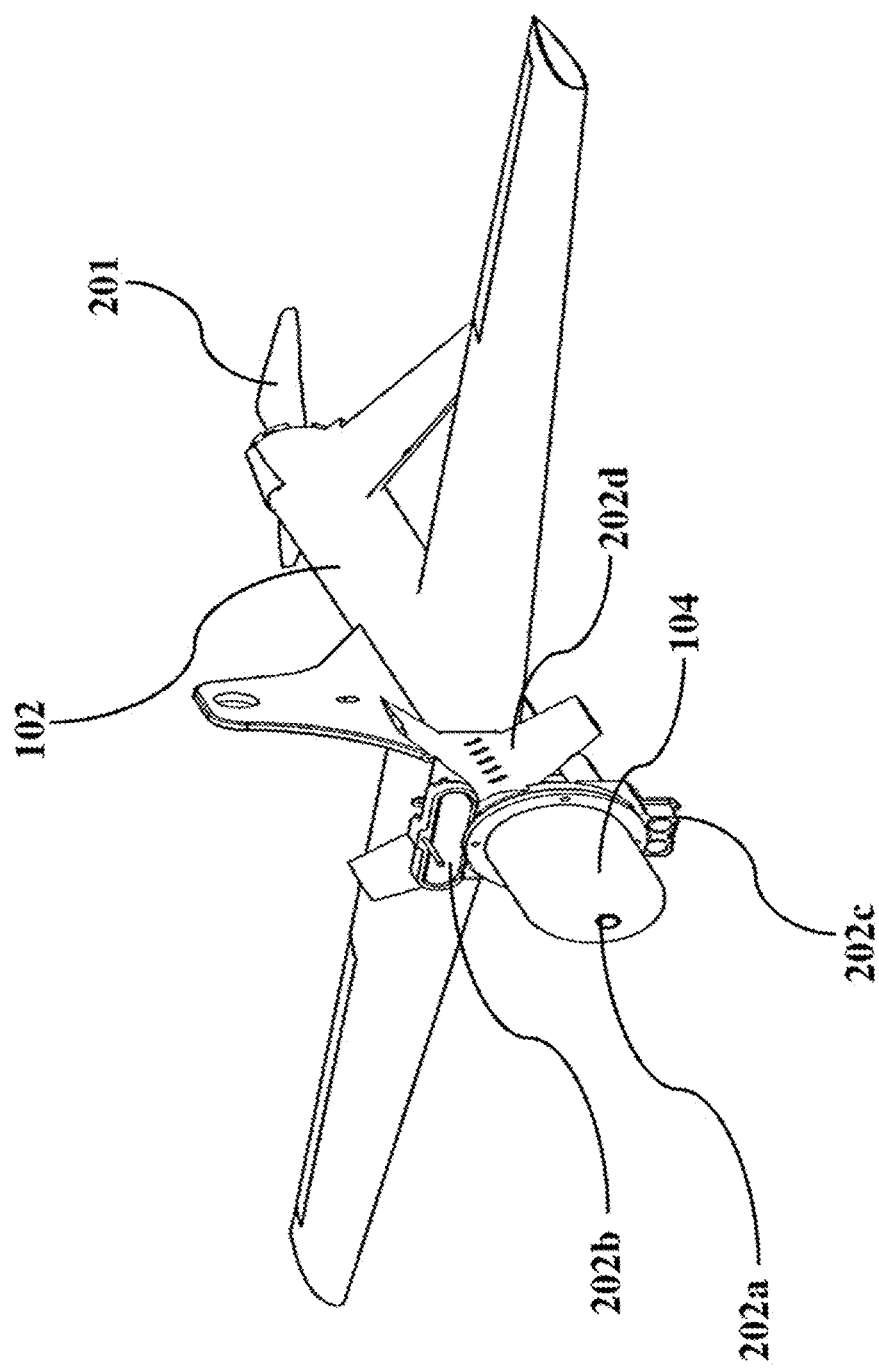
FIG. 3C illustrates an example apparatus of Group1 external payload of Precision Strike Loitering Munition (PSLM) deployment in FIG. 3B during a third phase of the example High Value Targeting (HVT) missions, Multi-Domain Operations (MDO), and being a member of manned-unmanned teaming (MUM-T) implemented in accordance with the teachings of this disclosure.

As represented in FIG. 3C, an example apparatus of Group1 external payload of PSLM 102 reflecting a low RCS and having a small electric motor 201 to reflect a small heat signature.

The PSLM 102 may be equipped with Commercial off-the-shelf (COTS) onboard companion computer 202*d* having built-in Reinforcement Learning (RL) and Machine Vision (MV) algorithms processing in real-time the inputs gathered by a combination of onboard EO/IR seekers 202*a*, stereo vision sensors 202*b*, and 2D Light Detection and Ranging (LiDAR) 202*c* used for terminal homing guidance along with searching, identifying, and tracking multiple targets autonomously. The PSLM 102 may be also equipped multiple types of proximity warheads 104 depending on the type of target and mission endurance including High Explosive Fragmentation (HEF), Fuel Air Explosive (FAE), and High-explosive anti-tank (HEAT), used to attack multiple targets autonomously.

Figure 3D:
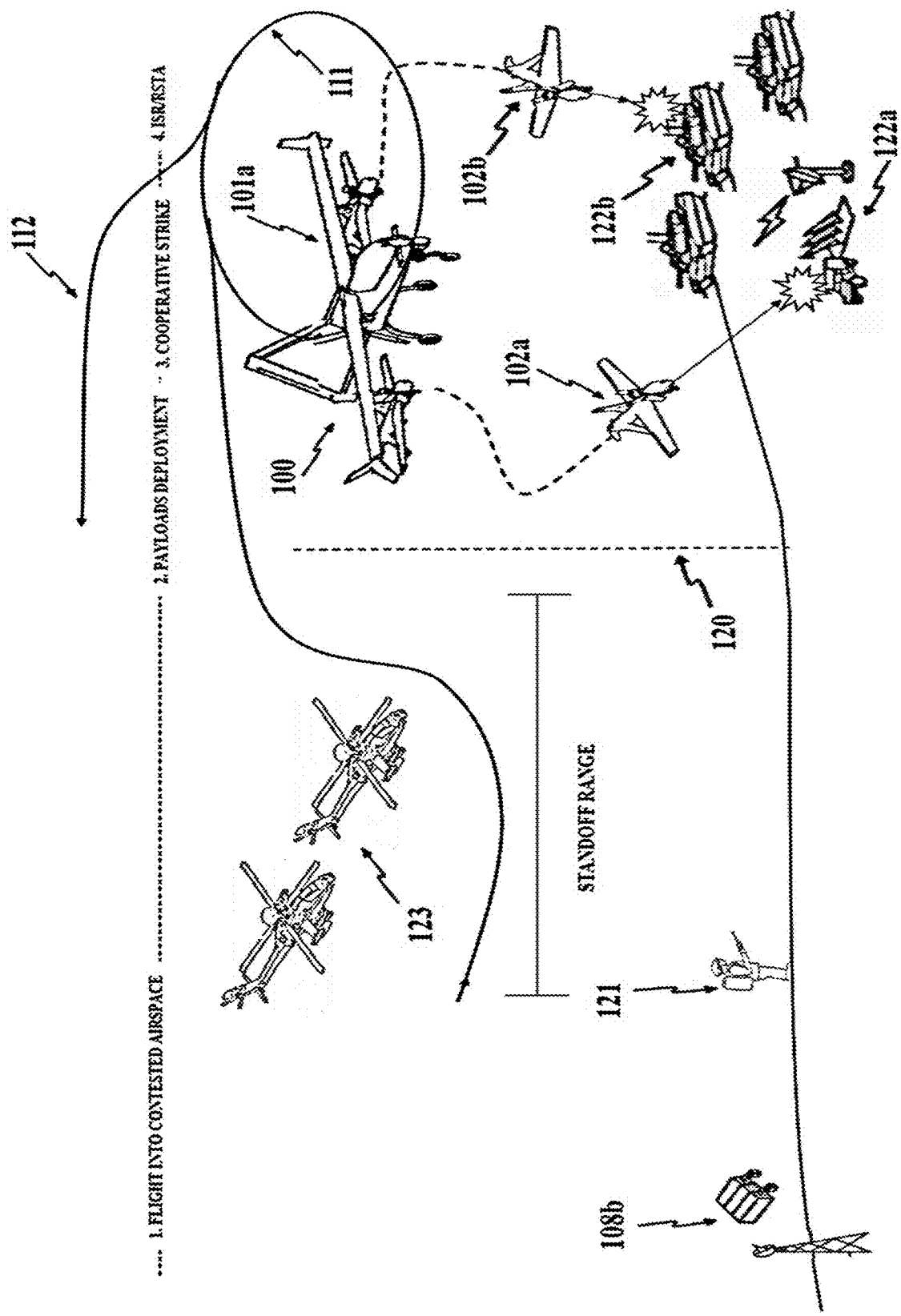
FIG. 3D illustrates the example Family of Unmanned Aircraft Systems (FoUAS) platform of FIG. 3A operational scenario example in High Value Targeting (HVT) missions or Multi-Domain Operations (MDO) between air and land forces when deployed as a single agent operated from a standoff range when the symmetric payloads including at least two Group1 LMs used as PSLMs illustrated in FIG. 3D to conduct cooperative strike operations against enemy's SHORAD systems, tanks, armored vehicles, and ground troops, while continuing to utilize the STUAS mothership for close-range ISR/RSTA operations and return to launch point during a fourth phase of the example High Value Targeting (HVT) missions or Multi-Domain Operations (MDO) implemented in accordance with the teachings of this disclosure.

The embodiments disclosed herein allow a novel method of deploying an example Family of Unmanned Aircraft Systems (FoUAS) platform in High Value Targeting (HVT) missions or Multi-Domain Operations (MDO) between air and land forces as shown in FIG. 3D. In this regard, the novel method can be viewed as an operational scenario example of the disclosed FoUAS platform 100 deployment as a single agent which is broadly summarized by four phases herein: the first phase may include the flight into contested airspace where an example Family of Unmanned Aircraft Systems (FoUAS) platform 100 is deployed from a standoff range as a single agent while being semi-autonomously guided via GPS 107, flying at a very low attitude of less than 100 feet AGL depending on terrain while following a preprogrammed route. Then, orbiting/loitering at a pre-defined "Holding Area" 111 over an anti-access/area denial (A2/AD) zone 120; where a Joint Force Commander (JFC) may command a member of a land force echelon 121 to utilize the STUAS mothership 101*a* for close-range Reconnaissance, Surveillance and Target Acquisition (RSTA) operations; The second phase may include the example STUAS 101*a* air-launching simultaneously at least two Group1 symmetric Precision Strike Loitering Munitions (PSLM) 102 *a-b* and deploying them by multiple PICs from different forces with the ability to control the STUAS and both PSLMs 102 *a-b* simultaneously via cross-domain command and control relay from mobile Ground Control Station (GCS) 108*b* as per STANAG 4586; allowing joint forces to share/divide control of the disclosed FoUAS platform. The third phase may include the example PSLMs 102 *a-b* orbiting/loitering over targets and conduct cooperative strike operations against enemy's short-range air defense (SHORAD) systems 122*a*, tanks 122*b*, and armored vehicle based on the intelligence gathered by the STUAS 101*a* or ground units. The fourth phase may include the example STUAS 101*a* providing Battle Damage Assessment (BDA) after conducting strikes by example PSLMs 102 *a-b* and return to launch point following a preprogrammed route 112. This methodology capitalizes on the strengths of each force while extending tactical and operational reach and lethality of manned assets such as attack helicopters 123 allowing them to remain outside of the range of enemy defense weapon systems. A detailed flow chart of the steps of this deployment method is of highlighted in FIG. 3E.

Figure 3E:
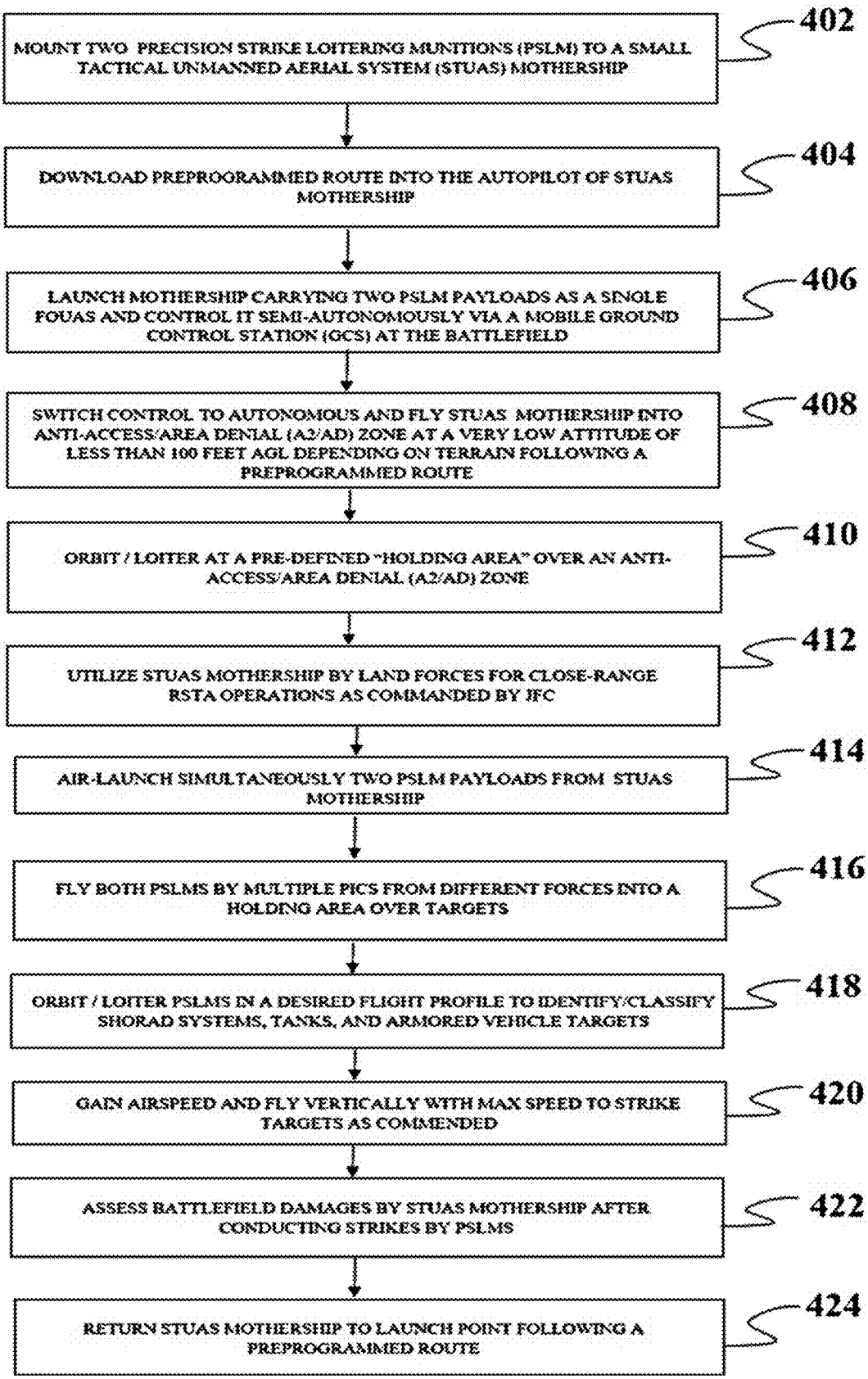
FIG. 3E illustrates a flow chart of deployment method steps of the example Family of Unmanned Aircraft Systems (FoUAS) platform operational scenario example of FIG. 3D.

As represented in FIG. 3E At 402, two PSLMs are mounted to a STUAS mothership. At 404, a preprogrammed route is downloaded into the autopilot of STUAS mothership. At 406, the STUAS mothership is launched and carrying two PSLMs as a single FoUAS and semi-autonomously operated from a mobile ground control station (GCS) at the battlefield via C2 link and SATOM during the first phase of the mission. At 408, the control is switched to autonomous and STUAS mothership flown into the Anti-Access/Area Denial (A2/AD) zone at a very low attitude of less than 100 feet AGL depending on terrain following a preprogrammed route. At 410, the STUAS mothership loiters at a pre-defined "holding area" over the A2/AD zone. At 412, the STUAS mothership is utilized by land forces for close-range RSTA operations as commanded by JFC. At 414, STUAS mothership air-launches simultaneously PSLMs during the second phase of the mission. At 416, both PSLMs of FoUAS flown into a holding area over targets by multiple PICs from different forces. At 418, both PSLMs of FoUAS orbit/loiter in a desired flight profile to identify/classify SHORAD systems, tanks, and armored vehicle targets. At 420, both PSLMs of FoUAS gain airspeed and fly vertically with max speed to strike the multiple targets as commended during the third phase of the mission. At 422, the STUAS mothership assess battlefield damages after conducting strikes by PSLMs during the fourth phase of the mission. At 424, the STUAS mothership is returned to launch point following a preprogrammed route.

Figure 3F:
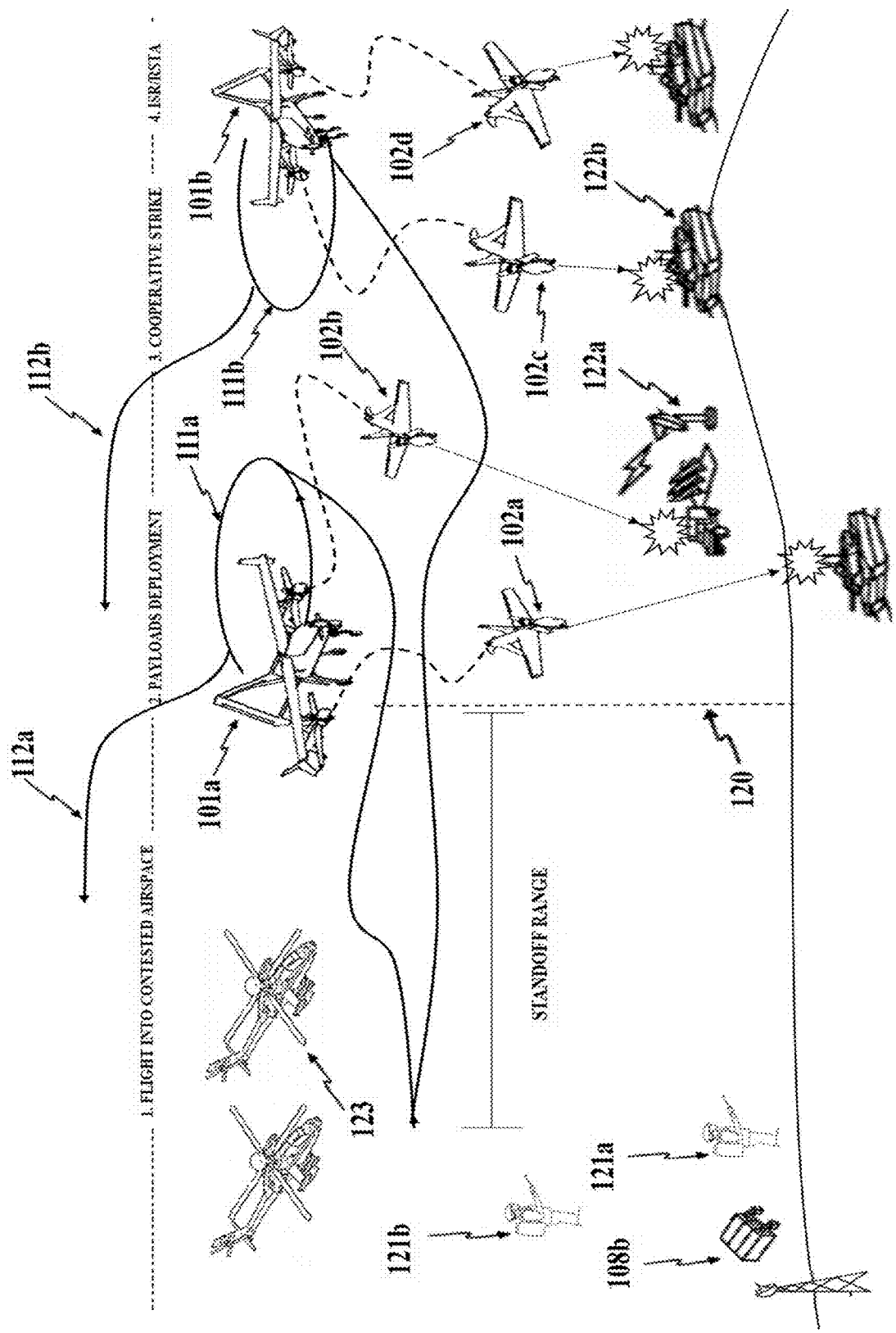
FIG. 3F illustrates the example Family of Unmanned Aircraft Systems (FoUAS) platform of FIG. 3A operational scenario example in High Value Targeting (HVT) missions or Multi-Domain Operations (MDO) between air and land forces when deployed as a swarm team operated from a standoff range. It includes at least two STUAS motherships with each carrying at least two Group1 LMs used as PSLMs to conduct cooperative strike operations against enemy's short-range air defense (SHORAD) systems, tanks, armored vehicles, and ground troops, while continuing to utilize both STUAS motherships for joint ISR/RSTA operations.

Another novel method of executing High Value Targeting (HVT) missions or Multi-Domain Operations (MDO) between air and land forces as shown in FIG. 3F illustrating the example FoUAS 100 platform operational scenario example as a swarm team while being operated from a standoff range. This operational scenario is broadly summarized by four phases herein: the first phase may include the flight into contested airspace where an example Family of Unmanned Aircraft Systems (FoUAS) platform 100 is deployed as swarm team consisting of at least two STUAS 101*a-b* being semi-autonomously guided via GPS 107 with the support of at least two PICs, flying at a very low attitude of less than 100 feet AGL depending on terrain while following a preprogrammed route. Then, orbiting/loitering at a pre-defined "Holding Areas" 111a-b over an anti-access/area denial (A2/AD) zone 120; where a Joint Force Commander (JFC) may command members of a land force echelon 121a-b to utilize both STUAS motherships 101a-b for close-range Reconnaissance, Surveillance and Target Acquisition (RSTA) operations. The second phase may include both STUAS 101a-b releasing simultaneously at least four Precision Strike Loitering Munitions (PSLM) 102a-b-c-d and deploying them by multiple from different forces with the ability to control the STUAS and PSLMs 102a-b-c-d simultaneously via cross-domain command and control relay from mobile Ground Control Station (GCS) 108b as per STANAG 4586; allowing both air and land forces to share/divide control of the disclosed FoUAS platform. The third phase may include PSLMs orbit/loiter over targets and conduct cooperative strike operations against enemy's short-range air defense (SHORAD) systems 122a, tanks 122b, and armored vehicle based on the intelligence gathered by the STUAS 101a-b or ground units. The fourth phase may include both example STUAS 101a-b providing Battle Damage Assessment (BDA) after conducting strikes by PSLMs and return to launch point following a preprogrammed route 112a-b. This methodology capitalizes on the strengths of each force while extending tactical and operational reach and lethality of manned assets such as attack helicopters 123 allowing them to remain outside of the range of enemy defense weapon systems. A detailed flow chart of the steps of this deployment method is of highlighted in FIG. 3G.

Figure 3G:
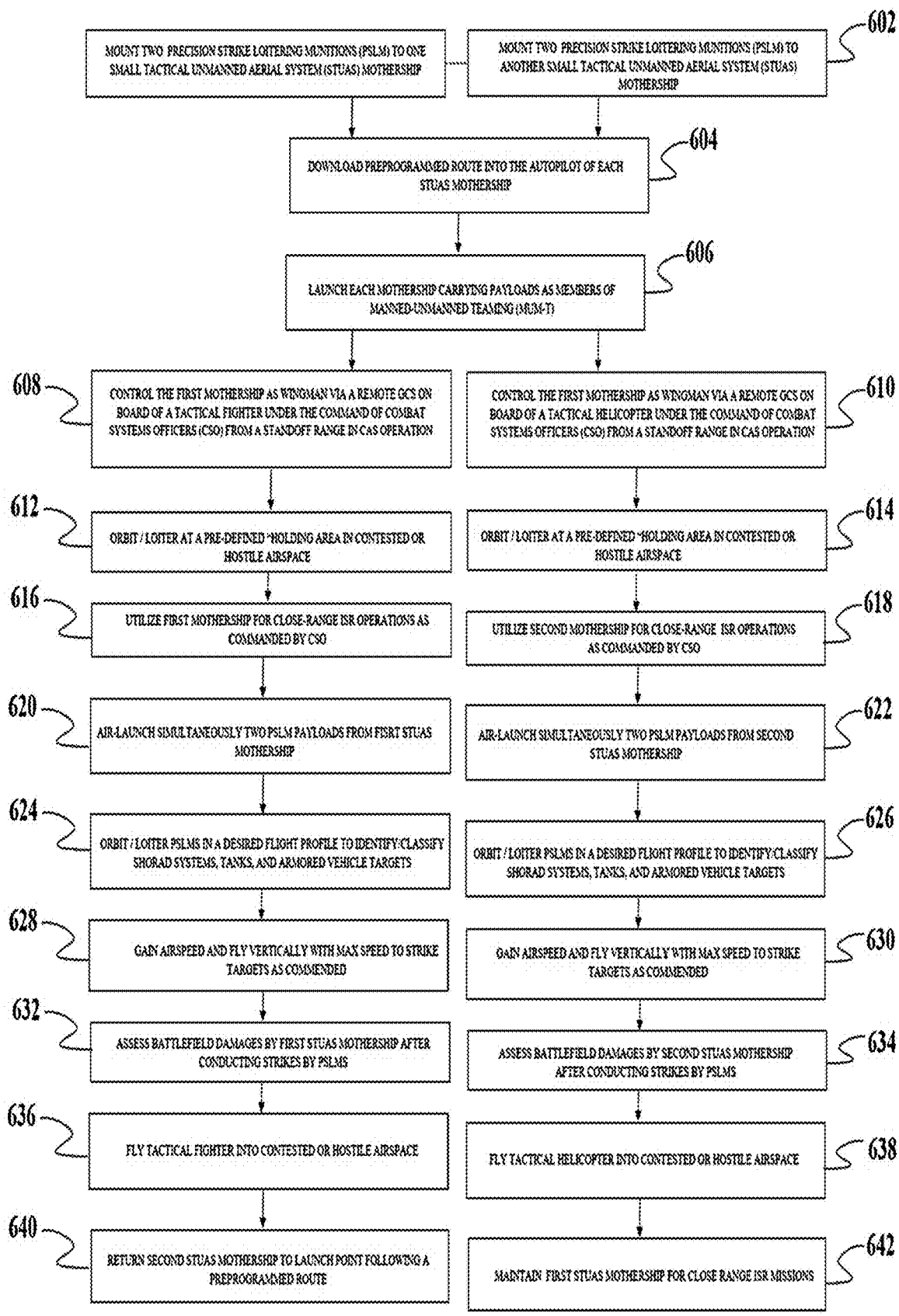
FIG. 3G illustrates a flow chart of deployment method steps of the example Family of Unmanned Aircraft Systems (FoUAS) platform operational scenario example of FIG. 3F.

As represented in FIG. 3G At 428, two PSLMs are mounted to two STUAS motherships.

At 430, a preprogrammed route is downloaded into the autopilot of both STUAS motherships. At 432, both of the STUAS motherships are launched with the first mothership is carrying two PSLMs and the second mothership is carrying the other two PSLM as a single FoUAS and semi-autonomously operated from a mobile ground control station (GCS) at the battlefield via C2 link and SATOM during the first phase of the mission. At 434, the control of the first STUAS mothership is switched to autonomous and flown into the Anti-Access/Area Denial (A2/AD) zone at a very low attitude of less than 100 feet AGL depending on terrain following a preprogrammed route. At 436, the control of the second STUAS mothership is switched to autonomous and flown into the Anti-Access/Area Denial (A2/AD) zone at a very low attitude of less than 100 feet AGL depending on terrain following a preprogrammed route. At 438, the first STUAS mothership loiters at a pre-defined "holding area" over the A2/AD zone. At 440, second STUAS mothership loiters at a pre-defined "holding area" over the A2/AD zone. At 442, the first STUAS mothership is utilized by land forces for close-range RSTA operations as commanded by JFC. At 444, the second STUAS mothership is utilized by land forces for close-range RSTA operations as commanded by JFC. At 446, the first STUAS mothership air-launches simultaneously two PSLMs during the second phase of the mission. At 448, the second STUAS mothership air-launches simultaneously two PSLMs during the second phase of the mission. At 450, both PSLMs of the first STUAS mothership flown into a holding area over targets by multiple PICs from different forces. At 452, both PSLMs of the second STUAS mothership flown into a holding area over targets by multiple PICs from different forces. At 454, both PSLMs of the first STUAS mothership orbit/loiter in a desired flight profile to identify/classify SHORAD systems, tanks, and armored vehicle targets. At 456, both PSLMs of the second STUAS mothership orbit/loiter in a desired flight profile to identify/classify SHORAD systems, tanks, and armored vehicle targets. At 458, both PSLMs of the first STUAS mothership gain airspeed and fly vertically with max speed to strike the multiple targets as commended during the third phase of the mission. 460, both PSLMs of the second STUAS mothership gain airspeed and fly vertically with max speed to strike the multiple targets as commended during the third phase of the mission. At 462, the first STUAS mothership assess battle-field damages after conducting strikes by PSLMs during the fourth phase of the mission. At 464, the second STUAS mothership assess battlefield damages after conducting strikes by PSLMs during the fourth phase of the mission. At 466, the first STUAS mothership is returned to launch point following a preprogrammed route. At 468, the second STUAS mothership is returned to launch point following a preprogrammed route.

Figure 3H:
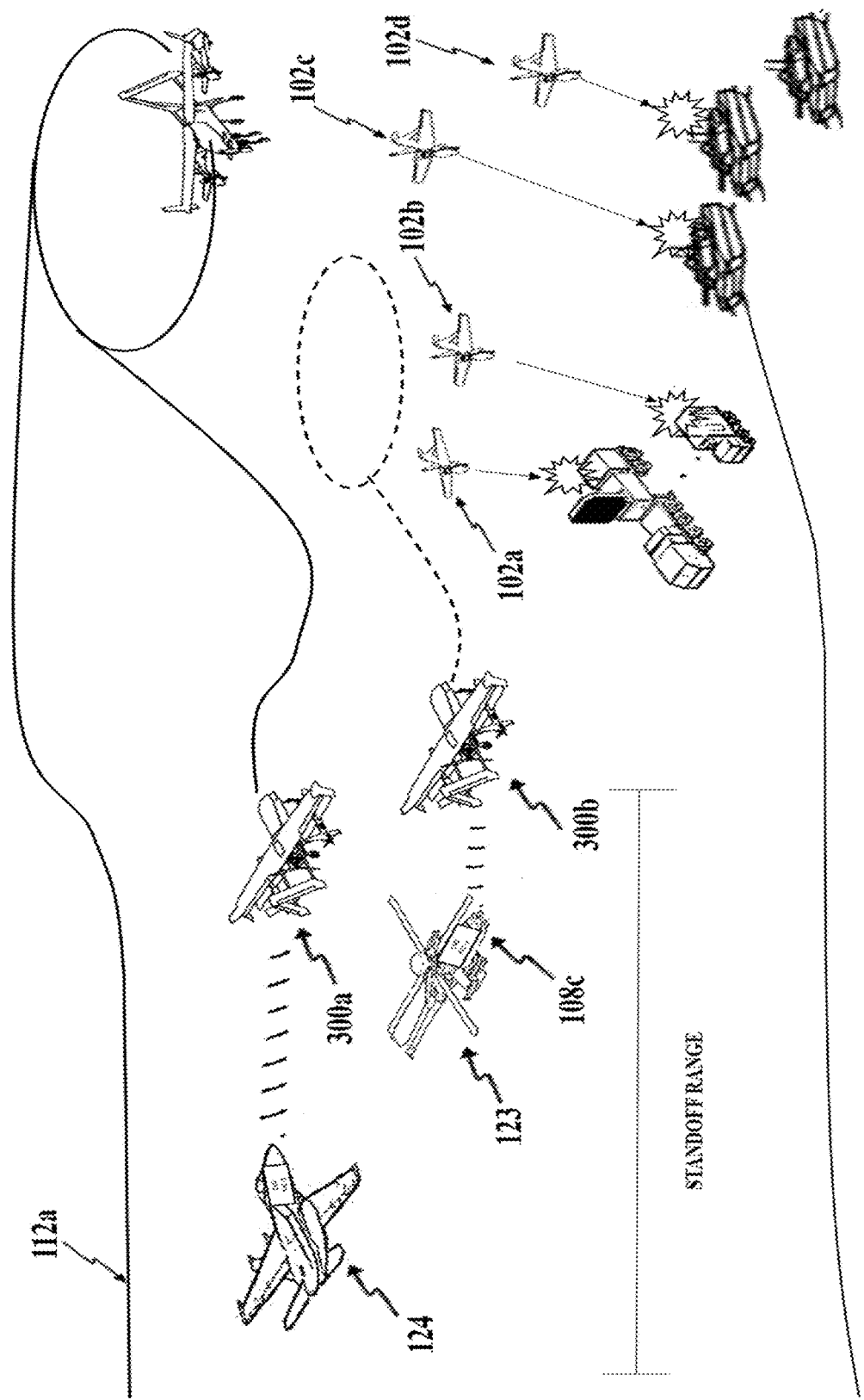
FIG. 3H illustrates the example Family of Unmanned Aircraft Systems (FoUAS) platform of FIG. 3A operational scenario example as a member of manned-unmanned teaming (MUM-T); in which Combat Systems Officers (CSO) or co-pilots of military fighters and helicopters act as PICs with the ability to guide and control multiple FoUAS platforms in synergistic combat and collaborative operations during high-risk missions while achieving greater air superiority (AS)

The embodiments disclosed herein allow a novel method of deploying an example Family of Unmanned Aircraft Systems (FoUAS) platform as a member of manned-unmanned teaming (MUM-T); in which Combat Systems Officers (CSO) or co-pilots of military fighters 124 and helicopters 123 act as remote PICs with the ability to guide and control multiple FoUAS platforms as unmanned partners/wingman 300 a-b as represented in FIG. 3H. In this regard, the novel method can be viewed as an operational scenario example of the disclosed FoUAS platform 100 deployment to conduct synergistic combat and collaborative combat operations during high-risk missions as well as monitor actions on the battlefield without being in acoustic or visual range, while still within range to provide kinetic effects, if required. In this scenario, each FoUAS would be controlled with level 5 of Interoperability (LOI-5), which may include the control and monitoring of the FoUAS mothership 101 along with the launch and of its Group 1 asymmetric or symmetric payloads such as small Unmanned Aircraft Systems (sUAS) 103 and Precision Strike Loitering Munitions (PSLM) 102. After deployment of PSLMs, the STUAS mothership could be utilized for close-range ISR missions or returned to launch point following a preprogrammed route 112a. This methodology requires the installation of a remote Ground Control Station (GCS) 108c in military fighters and helicopters to enable them to operate at standoff ranges while achieving greater air superiority (AS); as the FoUAS qualifies as a force-multiplier. A detailed flow chart of the steps of this deployment method is of highlighted in FIG. 3I.

Figure 3I:
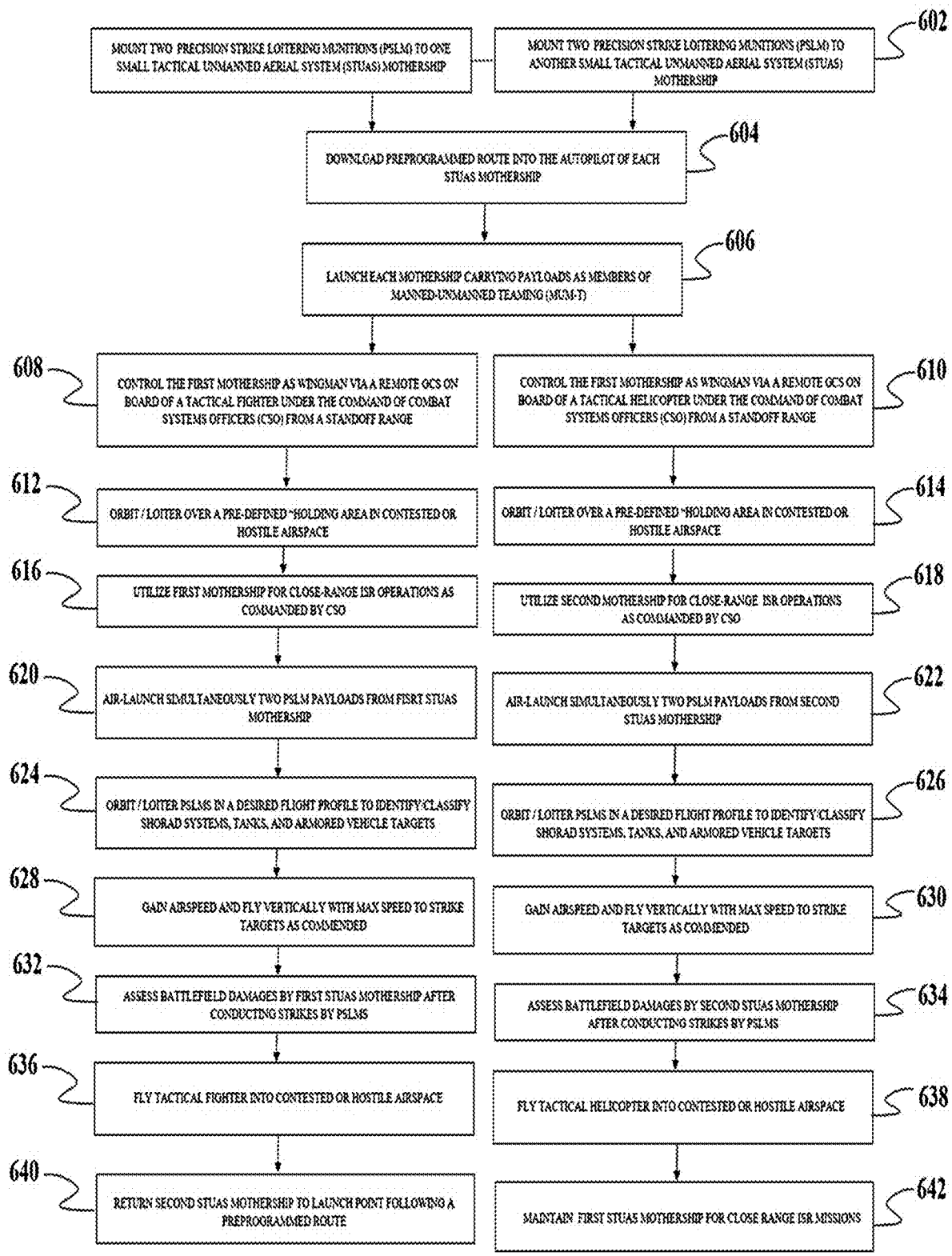
FIG. 3I illustrates a flow chart of deployment method steps of the example Family of Unmanned Aircraft Systems (FoUAS) platform operational scenario example of FIG. 3H.

As represented in FIG. 3I At 602, two PSLMs are mounted to two STUAS motherships.

At 604, a preprogrammed route is downloaded into the autopilot of both STUAS motherships. At 606, both of the STUAS motherships are launched with the first mothership is carrying two PSLMs and the second mothership is carrying the other two PSLM as members of Manned-Unmanned Teaming (MuM-T). At 608, control the first STUAS mothership as wingman via a remote GCS on board of a tactical fighter under the Command of Combat Systems Officers (CSO) from a standoff range. At 610, control the second STUAS mothership as wingman via a remote GCS on board of a tactical fighter under the Command of Combat Systems Officers (CSO) from a standoff range. At 612, the first STUAS mothership loiters over a pre-defined "holding area" in contested or hostile airspace. At 614, the second STUAS mothership loiters over a pre-defined "holding area" in contested or hostile airspace. At 616, the first STUAS mothership is utilized for close-range ISR operations as commanded by CSO. At 618, the second STUAS mothership is utilized for close-range ISR operations as commanded by CSO. At 620, the first STUAS mothership air-launches simultaneously two PSLMs. At 622, the second STUAS mothership air-launches simultaneously two PSLMs. At 624, both PSLMs of the first STUAS mothership orbit/loiter in a desired flight profile to identify/classify SHORAD systems, tanks, and armored vehicle targets. At 626, both PSLMs of the second STUAS mothership orbit/loiter in a desired flight profile to identify/classify SHORAD systems, tanks, and armored vehicle targets. At 628, both PSLMs of the first STUAS mothership gain airspeed and fly vertically with max speed to strike the multiple targets as commended. 630, both PSLMs of the second STUAS mothership gain airspeed and fly vertically with max speed to strike the multiple targets as commended. At 632, the first STUAS mothership assess battlefield damages after conducting strikes by PSLMs. At 634, the second STUAS mothership assess battlefield damages after conducting strikes by PSLMs. At 636, the tactical fighter commanding the first STUAS mothership is flown into contested or hostile airspace. At 638, the tactical helicopter commanding the second STUAS mothership is flown into contested or hostile airspace. At 640, the first STUAS mothership is returned to launch point following a preprogrammed route. At 642, the second STUAS mothership is returned to launch point following a preprogrammed route.

Figure 4A:
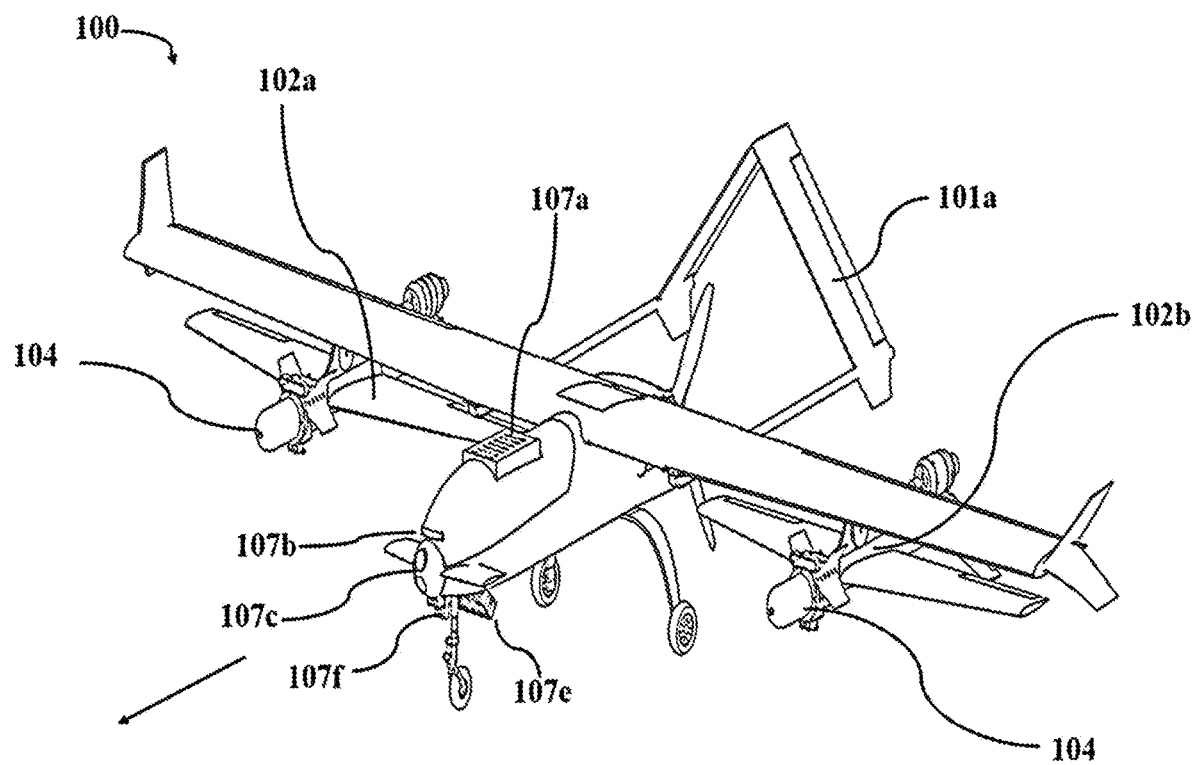
In FIG. 4A, the example mothership is depicted as carrying and flying the example Group1 symmetric payloads to a remote holding area during a first phase of the example C-UAS operations against LSS UAS threats implemented in accordance with the teachings of this disclosure.

As represented in FIG. 4A, an example apparatus of a Family of Unmanned Aircraft Systems (FoUAS) platform 100 including an example attritable Small Tactical Unmanned Aircraft System (STUAS) 101a utilized as a mothership, and example Group1 external symmetric payloads including jet-powered two LMs 102a-b carried via two aluminum alloy racks located under the wings of the STUAS 101a. The STUAS 101a is made of Commercial-Off-The-Shelf (COTS) materials and sub-systems with a MTOW of 88 pounds to 110 pounds; making it low-cost, attritable, reusable, and agile mothership platform. The disclosed STUAS may be equipped with internal payloads including EO/IR camera 107c, stereo vision sensors 107b, 3D LiDAR 107d, a low-cost 3D airborne radar 107e, and a and lightweight SATCOM 107a; to detect, localize, and track approaching LSS UAS threats in real-time during the second phase of the example C-UAS operations.

Figure 4B:
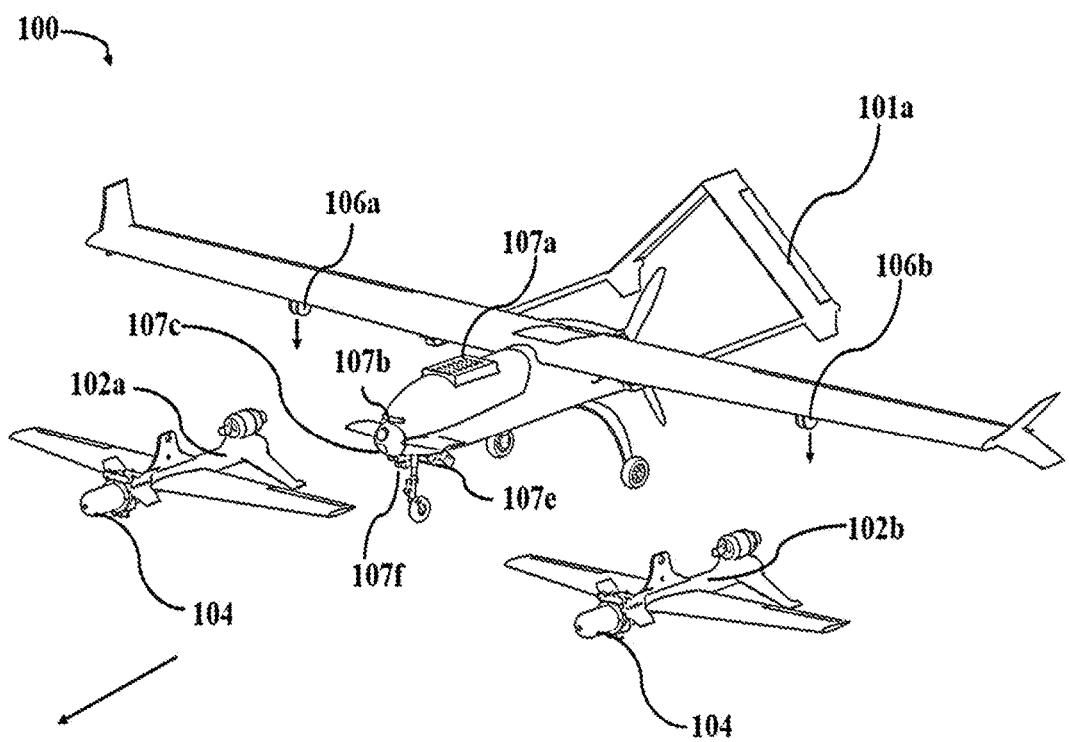
FIG. 4B illustrates an example apparatus of a Family of Unmanned Aircraft Systems (FoUAS) platform deployment of FIG. 4A when the example Group1 symmetric external payloads including example two jet-powered LMs are air-launched from the aluminum alloy racks located under the wings of the STUAS mothership during a third phase of the example C-UAS operations against a swarm LSS UAS threats implemented in accordance with the teachings of this disclosure.

As represented in FIG. 4B, an example apparatus of a Family of Unmanned Aircraft Systems (FoUAS) platform 100 deployment of FIG. 4A when the example Group1 external symmetric payloads including two jet-powered LMs 102a-b are air-launched simultaneously from the aluminum alloy racks 106 a-b located under the wings of the STUAS mothership 101a during the third phase of the example C-UAS operations. The symmetric payloads may free-fall via gravity to clear out of the STUAS mothership 101a airframe by activating two internally mounted servo motors and a pushrod-control pin lock.

Figure 4C:
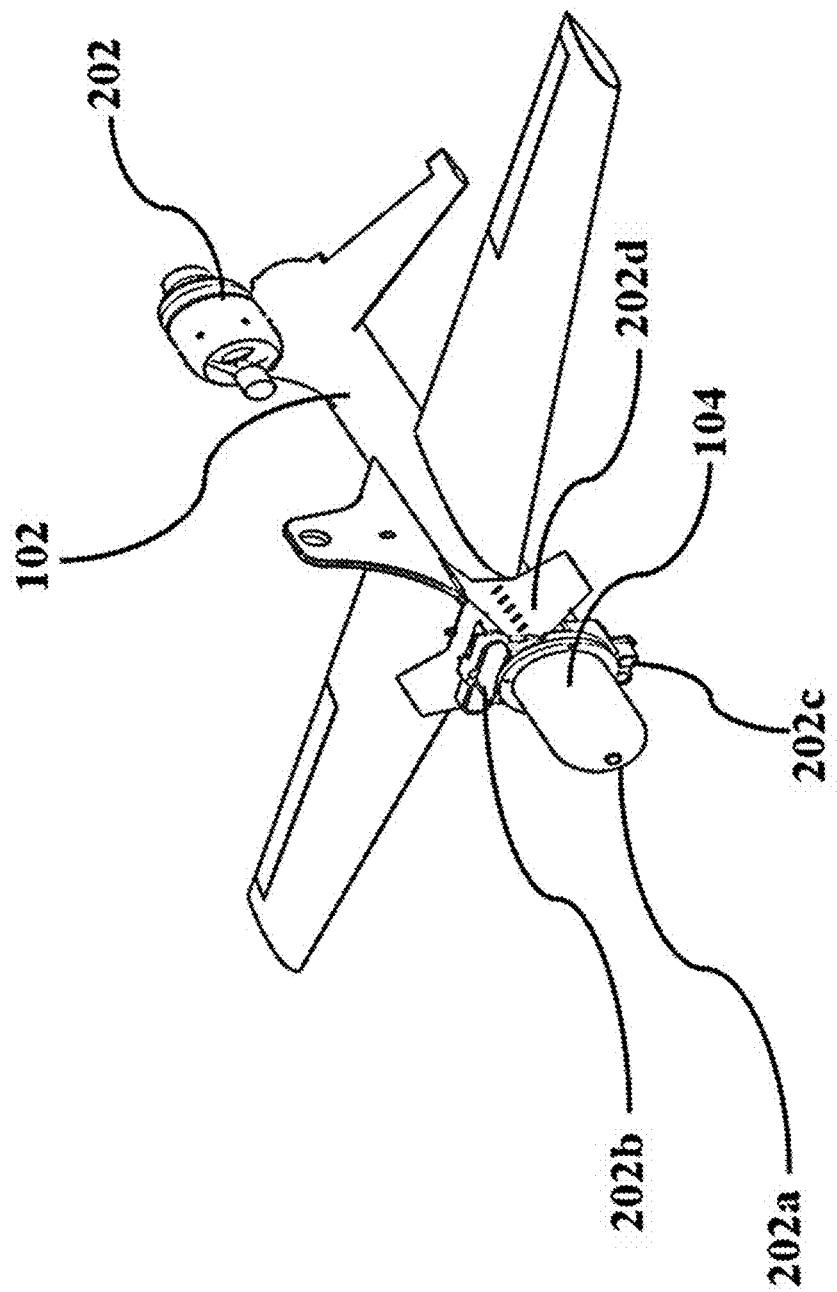
FIG. 4C illustrates an example apparatus of external payload of jet-powered Group 1LM deployment in FIG. 4B during a fourth phase of the example C-UAS operations against LSS UAS threats implemented in accordance with the teachings of this disclosure.

As represented in FIG. 4C, an example apparatus of external payload of LM 102 reflecting a low RCS and having a small jet engine 202 to intercept approaching LSS UAS threats quickly.

The LM 102 may be equipped with Commercial off-the-shelf (COTS) onboard companion computer 202d having built-in Reinforcement Learning (RL) and Machine Vision (MV) algorithms processing in real-time the inputs gathered by a combination of onboard EO/IR seekers 202a, stereo vision sensors 202b, and 2D Light Detection and Ranging (LiDAR) 202c used for detecting and tracking the heat signature of approaching LSS UAS threats autonomously. The LM 102 may be also equipped with a High Explosive Fragmentation (HEF) proximity warhead 104 used to destruct approaching LSS UAS threats mid-air effectively during the fourth phase of the example C-UAS operations.

The embodiments disclosed herein allow a novel method of deploying an example Family of Unmanned Aircraft Systems (FoUAS) platform in C-UAS operations against a single LSS UAS threat as shown in FIG. 4D. In this regard, the novel method can be viewed as an operational scenario example of the disclosed FoUAS platform 100 deployment as a single agent which is broadly summarized by four phases herein: the first phase may include the example STUAS 101a mothership of the FoUAS 100 being guided via a single PIC 121a from a mobile Ground Control Station (GCS) 108b in real-time C2 link and within a Line-of-sight (LOS) range up to 250 km or Beyond-Line-of-sight (BLOS) using SATCOM link depending on terrain; flown directly into the expected flight path or trajectory of approaching UAS threat 140 after detecting it by ground-based air surveillance radars 130. The second phase may include airborne the detection of approaching LSS UAS threat 140 in real-time via the use of onboard low-cost 3D airborne radar 107e, EO/IR camera 107c, stereo vision sensors 107b, 3D LiDAR 107d, and then localizing and tracking approaching LSS UAS threat 140. The third phase may include air-launching at least two Group1 symmetric jet-powered LMs 102 a-b from a safe deployment position 125 with a close proximity to the UAS threat 140 depending on its cruise speed and altitude, and returning STUAS 101 to its launch point following a preprogrammed route 112. The fourth phase may include the guidance of both LMs 102a-b by onboard companion computer; having built-in Reinforcement Learning (RL) and Machine Vision (MV) algorithms processing in real-time, then rely on their onboard EO/IR seekers, stereo vision sensors, and 2D LiDAR sensors to intercept the threat 140 and destruct it mid-air effectively. A detailed flow chart of the steps of this deployment method is of highlighted in FIG. 4E.

Figure 4E:
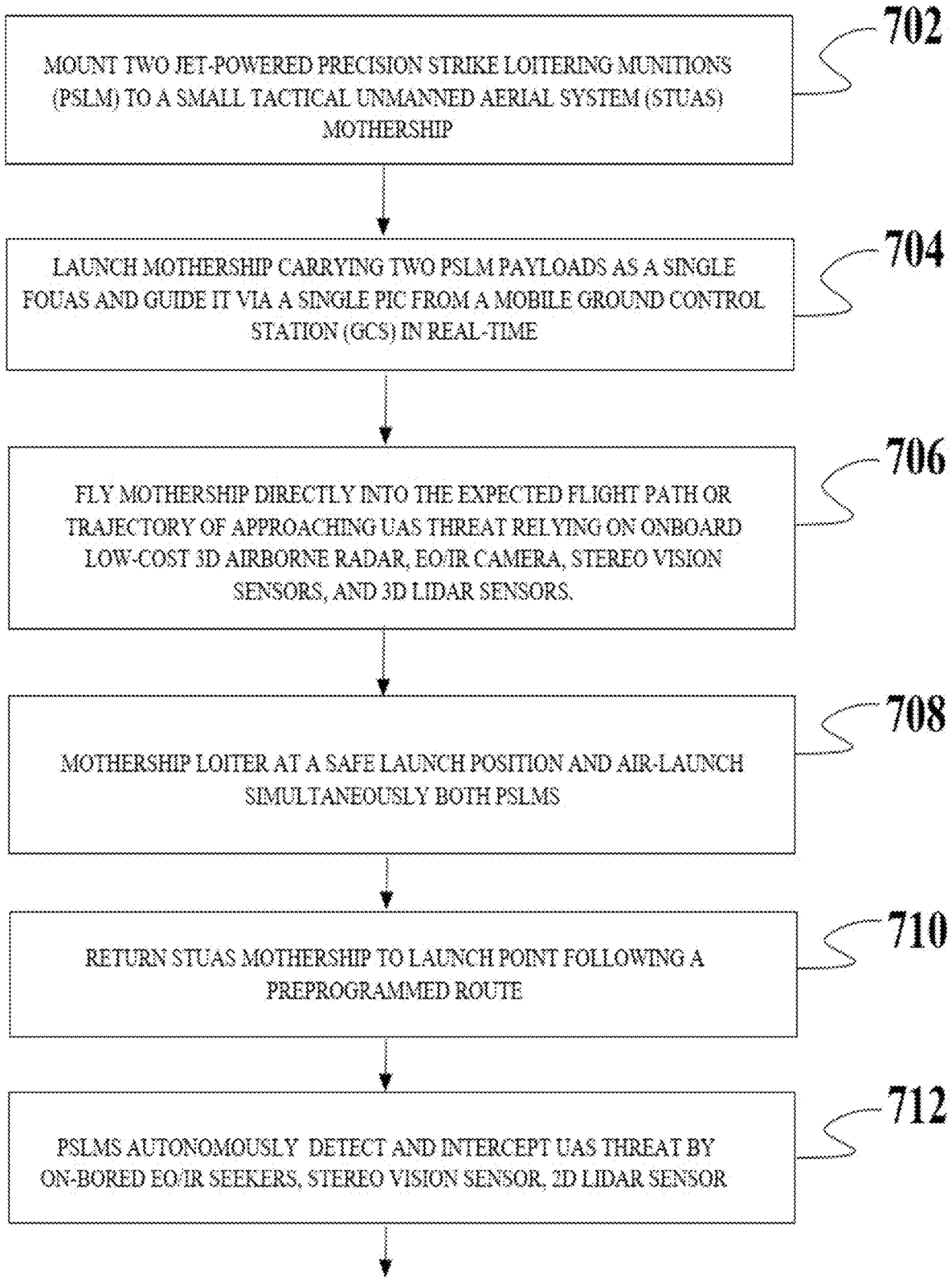
FIG. 4E illustrates a flow chart of deployment method steps of the example Family of Unmanned Aircraft Systems (FoUAS) platform operational scenario example of FIG. 4D.

As represented in FIG. 4E At 702, two jet-powered PSLMs are mounted to a STUAS mothership. At 704, the STUAS mothership is launched and carrying two Group1 LMs as a single FoUAS semi-autonomously operated from a mobile ground control station (GCS) in real-time via C2 link and SATOM. At 706, the STUAS mothership is directly flown into the expected flight path or trajectory of approaching UAS threat relying on the onboard low-cost 3D airborne radar, EO/IR camera, stereo vision sensors, and 3D LiDAR sensors. At 708, the STUAS mothership loiters at a safe launch position and air-launch simultaneously both of the jet-powered LMs. At 710, the STUAS mothership is returned to launch point following a preprogrammed route. At 712, both LMs of FoUAS flying autonomously to detect and intercept UAS threat by on-bored EO/IR seekers, stereo vision sensor, 2D lidar sensor.

Figure 4F:
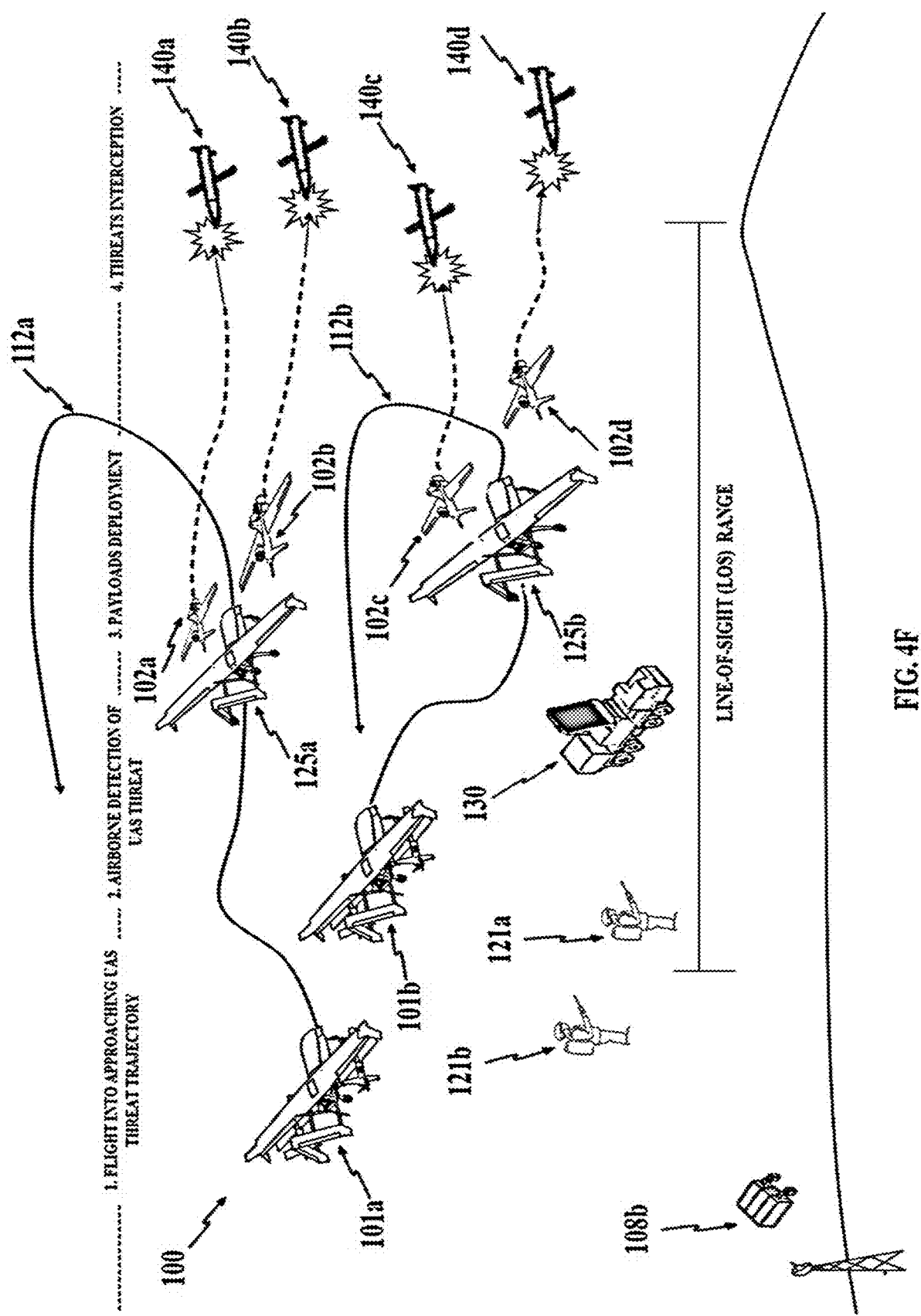
FIG. 4F illustrates the example Family of Unmanned Aircraft Systems (FoUAS) platform operational scenario example when deployed as a swarm team in C-UAS operations against a swarm of LSS UAS threats.

The embodiments disclosed herein allow a novel method of deploying an example Family of Unmanned Aircraft Systems (FoUAS) platform in C-UAS operations against a swarm of LSS UAS threats as shown in FIG. 4F. In this regard, the novel method can be viewed as an operational scenario example of the disclosed FoUAS platform 100 deployment as a swarm team which is broadly summarized by four phases herein: the first phase may include at least two STUAS 101a-b being guided via multiple PICs 121a-b from a mobile Ground Control Station (GCS) 108b in real-time within a range up to 250 km or Beyond-Line-of-sight (BLOS) using SATCOM link depending on terrain; flown directly into the expected flight path or trajectory of approaching multiple UAS threats 140 a-b-c-d after detecting them by ground-based air surveillance radars 130. The second phase may include airborne the detection of approaching swarm of UAS threats 140 *a-b-c-d* in real-time via the use of onboard low-cost 3D airborne radar 107*e*, EO/IR camera 107*c*, stereo vision sensors 107*b*, 3D LiDAR 107*d*, and then localizing and tracking the swarm of UAS threats 140 *a-b-c-d*. The third phase may include air-launching at least four Group1 symmetric jet-powered LMs 102 *a-b-c-d* safe deployment positions 125*a-b* with a close proximity to the swarm of UAS threats 140 *a-b-c-d* depending on their cruise speeds and altitudes, and returning both STUAS 101*a-b* to launch point following preprogrammed routes 112 *a-b*. The fourth phase may include the guidance of four LMs 102 *a-b-c-d* by onboard companion computer; having built-in Reinforcement Learning (RL) and Machine Vision (MV) algorithms processing in real-time, then rely on their onboard EO/IR seekers, stereo vision sensors, and 2D LiDAR sensors to intercept the swarm of UAS threats 140 *a-b-c-d* and destruct them mid-air effectively. A detailed flow chart of the steps of this deployment method is of highlighted in FIG. 4G.

Figure 4G:
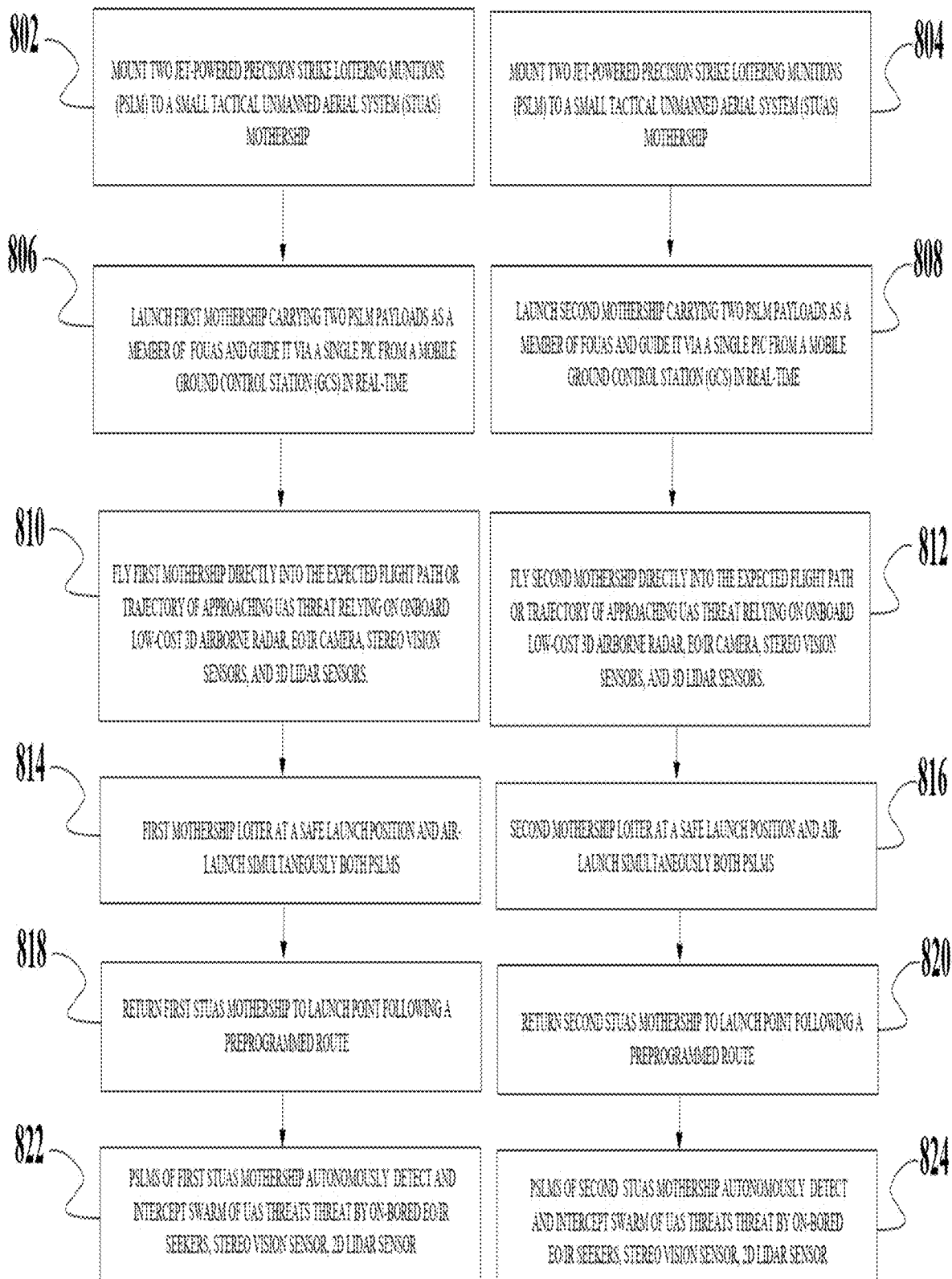
FIG. 4G illustrates a flow chart of deployment method steps of the example Family of Unmanned Aircraft Systems (FoUAS) platform operational scenario example of FIG. 4F.

As represented in FIG. 4G At 802, two jet-powered LMs are mounted to a the first STUAS mothership. At 804, two jet-powered LMs are mounted to the second STUAS mothership. At 806, the first STUAS mothership is launched and carrying two PSLMs as a single FoUAS semi-autonomously operated from a mobile ground control station (GCS) in real-time via C2 link and SATOM. At 808, the second STUAS mothership is launched and carrying two Group1 LMs as a single FoUAS semi-autonomously operated from a mobile ground control station (GCS) in real-time via C2 link and SATOM. At 810, the first STUAS mothership is directly flown into the expected flight path or trajectory of approaching swarm of UAS threats relying on the onboard low-cost 3D airborne radar, EO/IR camera, stereo vision sensors, and 3D LiDAR sensors. At 812, the second STUAS mothership is directly flown into the expected flight path or trajectory of approaching swarm of UAS threats relying on the onboard low-cost 3D airborne radar, EO/IR camera, stereo vision sensors, and 3D LiDAR sensors. At 814, the first STUAS mothership loiters at a safe launch position and air-launch simultaneously both of the jet-powered LMs. At 816, the second STUAS mothership loiters at a safe launch position and air-launch simultaneously both of the jet-powered LMs. At 818, the first STUAS mothership is returned to launch point following a preprogrammed route. At 820, the second STUAS mothership is returned to launch point following a preprogrammed route. At 822, both LMs of first STUAS mothership flying autonomously to detect and intercept swarm of UAS threats by on-bored EO/IR seekers, stereo vision sensor, 2D lidar sensor. At 824, both LMs of second STUAS mothership flying autonomously to detect and intercept swarm of UAS threats by on-bored EO/IR seekers, stereo vision sensor, 2D lidar sensor.

Although the above disclosure discusses what is currently considered to be a variety of useful embodiments, it is to be understood that such detail is solely for that purpose, and that the appended claims are not limited to the disclosed embodiments, but, on the contrary, is intended to cover modifications and equivalent arrangements that are within the spirit and scope of the appended claims.

What is claimed is:
1. An apparatus comprising:
   a Family of Unmanned Aircraft Systems (FoUAS) platform configured to perform multi-role precision strike, decoy, and ISR operations from a standoff range with the ability to function as a single agent or a swarm team,
   wherein the FoUAS includes 1) a low-cost attritable, reusable, and agile Small Tactical Unmanned Aircraft System (STUAS) mothership. 2) Group 1 asymmetric or symmetric Loitering Munitions (LMs), and 3) Group 1 asymmetric or symmetric small Unmanned Aircraft Systems (sUAS),
   the STUAS mothership having a maximum takeoff weight (MTOW) of 88 pounds to 110 pounds, and configured to equip internal payloads including an EO/IR camera or seekers, stereo vision sensors, 2D or 3D Light Detection and Ranging (LiDAR) sensors, a low-cost 3D airborne radar, and a lightweight SATCOM, and reflecting a small Radar Cross-Section (RCS); the STUAS mothership being configured to be autonomously guided via GPS or semi-autonomously guided via a single or multiple Pilots in Command (PICs), and wherein the STUAS mothership is further configured to fly to an area while carrying external payloads and release the external payloads while airborne and is operable to fly independent of the external payloads and after their release the external payloads including the Group 1 LMs and the Group 1 sUAS,
   wherein the Group 1 LMs are configured as a Precision Strike Loitering Munitions (PSLMs) reflecting a small RCS and having a small electric motor or small jet engine, the Group 1 LMs are configurable with Commercial off-the-shelf (COTS) onboard companion computer, having built-in Reinforcement Learning (RL) and Machine Vision (MV) algorithms processing in real-time the inputs gathered by a combination of onboard EO/IR seekers, stereo vision sensors, 2D LiDAR; used for terminal homing guidance along with searching, identifying, and tracking multiple aerial or ground targets autonomously, and wherein the PSLM is configured to be equipped with proximity warhead options including at least one of High Explosive Fragmentation (HEF), Fuel Air Explosive (FAE), and High-explosive anti-tank (HEAT) warheads depending on the type of target and mission,
   wherein the Group 1 sUAS are configured as Small Air Launched Decoys (SALD) with a large RCS having interchangeable payload including reflectors, chaff, and luneburg lens to deceive the enemy's fire control radars.

2. The apparatus according to claim 1, wherein the STUAS mothership includes aluminum alloy racks located onder each wing of the STUAS mothership
   wherein Group 1 asymmetric or symmetric payloads including SUAS and LMs, are air-launched as a result of free-fall via gravity from the aluminum alloy racks during a second phase in each mission implemented in accordance with the teachings of this disclosure.

3. The apparatus according to claim 1, wherein the Family of Unmanned Aircraft Systems (FoUAS) platform is configured to operate as a single agent to execute Suppression/Destruction of Enemy Air Defense (SEAD/DEAD) missions, in which at least two Group 1 asymmetric payloads including a sUAS acting as Small Air Launched Decoy (SALD), and a LM acting as Precision Strike Loitering Munition (PSLM) are used against Integrated Air Defense Systems (IADS).

4. The apparatus according to claim 1, wherein the Family of Unmanned Aircraft Systems (FoUAS) platform is configured to operate as a swarm team to execute Suppression/

Destruction of Enemy Air Defense (SEAD/DEAD) missions, in which at least a first FoUAS platform comprised of one mothership carrying symmetric payloads including two Group 1 SUAS are used as a SALD/decoys flying ahead to conduct SEAD, with the mothership equipped with a proximity warhead is used to conduct DEAD against Integrated Air Defense Systems (IADS), wherein, a second FoUAS platform comprised of one mothership carries symmetric payloads including two Group 1 LMs acting as PSLMs are used for strike while the mothership is used to conduct damage assessment and ISR activities of the enemy's assets surrounding the IADS site.

5. The apparatus according to claim 1, wherein the Family of Unmanned Aircraft Systems (FoUAS) platform is configured to operate as a single agent to conduct High Value Targeting (HVT) missions and Multi-Domain Operations (MDO) between air and land forces, in which at least two symmetric payloads including two Group 1 LMs acting as PSLMs used to conduct cooperative strike operations against enemy's SHORAD systems, tanks, armored vehicles, and ground troops, while continuing to utilize the STUAS mothership for close-range ISR/RSTA operations.

6. The apparatus according to claim 1, wherein the Family of Unmanned Aircraft Systems (FoUAS) platform is configured to operate as a swarm team to conduct High Value Targeting (HVT) missions and Multi-Domain Operations (MDO) between air and land forces, in which at least two STUAS motherships each carrying at least two Group1 LMs acting as PSLMs to conduct cooperative strike operations against enemy's short-range air defense (SHORAD) systems, tanks, armored vehicles, and ground troops, while continuing to utilize both STUAS motherships for joint ISR/RSTA operations.

7. The apparatus according to claim 1, wherein the Family of Unmanned Aircraft Systems (FoUAS) platform is configured to operate as a member of manned-unmanned teaming (MUM-T) to conduct Close Air Support (CAS) missions, in which Combat Systems Officers (CSO) or co-pilots of military fighters and helicopters act as PICs with the ability to guide and control multiple FoUAS platforms in synergistic combat and collaborative operations during high-risk missions while achieving greater air superiority (AS).

8. The apparatus according to claim 1, wherein the Family of Unmanned Aircraft Systems (FoUAS) platform is configured to operate as a single agent in Counter-Unmanned Air System (C-UAS) operations, in which at least two jet-powered Group 1 LMs are air-launched and used as a C-UAS tactical technique to intercept and defeat (hit-to kill) a single Low, Slow and Small (LSS) UAS threat.

9. The apparatus according to claim 1, wherein the Family of Unmanned Aircraft Systems (FoUAS) platform is configured to operate as a swarm team in Counter-Unmanned Air System (C-UAS) operations, in which at least two STUAS motherships each carrying at least two jet-powered Group1 LMs are air-launched and used as a C-UAS tactical technique to intercept and defeat (hit-to kill) a swarm of Low, Slow and Small (LSS) UAS threats.

\* \* \* \* \*